(12) United States Patent
Downey et al.

(10) Patent No.: US 11,649,645 B2
(45) Date of Patent: May 16, 2023

(54) SHOCK ABSORBING MAT/TILE AND FLOOR COVERING EMPLOYING THE SAME

(71) Applicant: Pliteq Inc., Toronto (CA)

(72) Inventors: Paul Downey, Toronto (CA); Paul Gartenburg, Toronto (CA); Matthew Golden, Toronto (CA)

(73) Assignee: PLITEQ INC., Toronto (CA)

( * ) Notice: Subject to any disclaimer, the term of this patent is extended or adjusted under 35 U.S.C. 154(b) by 136 days.

(21) Appl. No.: 16/998,469

(22) Filed: Aug. 20, 2020

(65) Prior Publication Data

US 2020/0378138 A1    Dec. 3, 2020

Related U.S. Application Data

(63) Continuation of application No. 16/746,051, filed on Jan. 17, 2020, now abandoned, which is a continuation of application No. 15/708,226, filed on Sep. 19, 2017, now abandoned.

(60) Provisional application No. 62/396,792, filed on Sep. 19, 2016.

(51) Int. Cl.
*E04F 15/22* (2006.01)
*E04F 15/10* (2006.01)
*B32B 3/30* (2006.01)

(52) U.S. Cl.
CPC ............. *E04F 15/225* (2013.01); *B32B 3/30* (2013.01); *E04F 15/10* (2013.01); *E04F 15/105* (2013.01); *E04F 15/22* (2013.01); *B32B 2471/04* (2013.01); *B32B 2553/02* (2013.01); *E04F 2201/0138* (2013.01); *E04F 2203/00* (2013.01); *E04F 2290/043* (2013.01)

(58) Field of Classification Search
CPC ....... E04F 15/22; E04F 15/225; E04F 15/105; E04F 15/10; E04F 2201/0138; E04F 2203/00; E04F 2290/043; B32B 3/30; B32B 2471/04

See application file for complete search history.

(56) References Cited

U.S. PATENT DOCUMENTS

| | | | |
|---|---|---|---|
| 5,509,244 A * | 4/1996 | Bentzon | E04F 15/02172 428/44 |
| 6,656,562 B2 | 12/2003 | Malpass | |
| 6,752,450 B2 | 6/2004 | Carroll | |
| D570,503 S * | 6/2008 | Leier | D25/156 |
| D611,625 S * | 3/2010 | Ardern | D25/153 |
| 8,240,430 B2 | 8/2012 | Downey | |
| 8,535,785 B2 | 9/2013 | Masanek | |

(Continued)

FOREIGN PATENT DOCUMENTS

| KR | 20130008316 A | 1/2013 |
|---|---|---|
| KR | 20150092831 A | 8/2015 |

*Primary Examiner* — Brian E Glessner
*Assistant Examiner* — Daniel J Kenny
(74) *Attorney, Agent, or Firm* — Tarolli, Sundheim, Covell & Tummino LLP

(57) ABSTRACT

A shock absorbing mat/tile comprises a body having a generally planar, major top surface and an opposite bottom surface and a plurality of shock absorbing members depending from the bottom surface. At least one of the shock absorbing members has at least one relief formation formed therein configured to accommodate lateral expansion of the shock absorbing member during axial compression thereof.

23 Claims, 27 Drawing Sheets

(56) References Cited

U.S. PATENT DOCUMENTS

| | | |
|---|---|---|
| 8,556,029 B2 | 10/2013 | Downey |
| 8,703,275 B2 | 4/2014 | Reichwein |
| 9,631,375 B1 * | 4/2017 | Barlow ................. E04F 15/225 |
| 2011/0076457 A1 | 3/2011 | Reichwein |
| 2011/0135852 A1 | 6/2011 | Sawyer |
| 2011/0296594 A1 | 12/2011 | Thomas |
| 2013/0095291 A1 | 4/2013 | Masanek |
| 2015/0361675 A1 * | 12/2015 | Cerny ................... E04F 15/105 |
| | | 52/509 |
| 2015/0376904 A1 | 12/2015 | Huss |
| 2016/0053498 A1 | 2/2016 | Brown |
| 2016/0130803 A1 | 5/2016 | Comitale |
| 2016/0138275 A1 | 5/2016 | Cormier |
| 2017/0226706 A1 | 8/2017 | Sawyer |
| 2017/0362841 A1 | 12/2017 | Comitale |
| 2018/0038118 A1 | 2/2018 | Moller |
| 2018/0073254 A1 | 3/2018 | Hainbach |

\* cited by examiner

SHOCK ABSORBING MAT/TILE AND FLOOR COVERING EMPLOYING THE SAME

CROSS REFERENCE TO RELATED APPLICATION

This application is a continuation of U.S. Non-Provisional application Ser. No. 16/746,051 filed Jan. 17, 2020, which is a continuation of Ser. No. 15/708,226 filed Sep. 19, 2017, which claims the benefit of U.S. Provisional Application No. 62/396,792 filed on Sep. 19, 2016 entitled "Shock Absorbing Mat" to Downey et al., the entire contents of which are incorporated herein by reference.

FIELD

The subject application relates generally to mats or tiles, and more particularly, to a shock absorbing mat/tile and floor covering employing the same.

BACKGROUND

Insulating building structures to inhibit the transmission of vibration and sound from one region to another is common in many environments. For example, shock absorbing mats have been used in a wide variety of applications to cushion impacts and vibrations. These mats come in a range of known configurations. For example, U.S. Pat. Nos. 8,240,430 and 8,556,029, both to Downey, disclose noise and vibration mitigating mats having top and bottom surfaces and comprising a first layer formed of recycled bound rubber product, the first layer having a contoured bottom surface and a generally flat top surface, a second layer on the top surface of the first layer, the second layer being formed of a fabric, and a third layer on the second layer and being formed of recycled rubber product.

While the contribution of these above-mentioned mats is significant, the design of shock absorbing mats is continually evolving. Accordingly, improvements are desired. It is therefore an object to provide a novel shock absorbing mat/tile and floor covering employing the same.

SUMMARY

Accordingly, in one aspect there is provided a shock absorbing mat/tile comprising: a body having a generally planar, major top surface and an opposite bottom surface; and a plurality of shock absorbing members depending from the bottom surface, at least one of the shock absorbing members having at least one relief formation formed therein configured to accommodate lateral expansion of the shock absorbing member during axial compression thereof.

Other aspects/embodiments of the shock absorbing mat/tile are provided. For example, the previously described shock absorbing mat/tile, wherein a plurality of the shock absorbing members has at least one relief formation formed therein configured to accommodate lateral expansion of the shock absorbing member during axial compression thereof.

The previously described shock absorbing mat/tile, wherein a plurality of the shock absorbing members has a plurality of relief formations formed therein configured to accommodate lateral expansion of the shock absorbing member during axial compression thereof.

The previously described shock absorbing mat/tile, wherein each of said shock absorbing members is substantially identical.

The previously described shock absorbing mat/tile, wherein the relief formations comprise relief grooves that extend radially with respect to a central axis of the shock absorbing member.

The previously described shock absorbing mat/tile, wherein the relief grooves are circumferentially spaced about the central axis of the shock absorbing member.

The previously described shock absorbing mat/tile, wherein the relief formations further comprise a centrally located recess formed in the shock absorbing member.

The previously described shock absorbing mat/tile, wherein each shock absorbing member comprises two sets of the radially extending relief grooves, one set of the relief grooves extending radially outward from the centrally located recess and completely through the shock absorbing member and the other set of the relief grooves extending radially inward toward the centrally located recess and partially through the shock absorbing member.

The previously described shock absorbing mat/tile, wherein the relief grooves of the one set extend from a distal end of the shock absorbing member to a base of the shock absorbing member and wherein the relief grooves of the other set extend from the base of the shock absorbing member partially towards the distal end.

The previously described shock absorbing mat/tile, wherein the relief grooves of the two sets have the same shape or wherein the relief grooves of the two sets have different shapes.

The previously described shock absorbing mat/tile, wherein the relief formations formed in each shock absorbing member of the plurality are concentrically spaced about a central axis of the shock absorbing member.

The previously described shock absorbing mat/tile, wherein the relief formations comprise a centrally located recess formed in the shock absorbing member and at least one ring-shaped groove formed in the shock absorbing member defining annular shock absorbing portions.

The previously described shock absorbing mat/tile, wherein the annular shock absorbing portions are (i) of the same height or (ii) are of different heights.

The previously described shock absorbing mat/tile, further comprising a plurality of supports depending from the bottom surface at locations less supported by shock absorbing members.

The previously described shock absorbing mat/tile, further comprising a plurality of interlocking features about the periphery of the body configured to engage adjacent shock absorbing mats/tiles.

According to another aspect there is provided a floor covering comprising a plurality of shock absorbing mats/tiles arranged contiguously and with the interlocking features of adjacent shock absorbing mats/tiles engaged.

According to another aspect there is provided a shock absorbing mat/tile comprising: a body having a generally planar, major top surface and an opposite bottom surface; a plurality of shock absorbing members depending from the bottom surface and arranged in an array, each of the shock absorbing members being substantially identical and comprising at least one relief formation formed therein configured to accommodate lateral expansion of the shock absorbing member during axial compression thereof; and a plurality of support posts depending from the bottom surface at locations less supported by shock absorbing members.

Other aspects/embodiments of the shock absorbing mat/tile are provided. For example, the previously described shock absorbing mat/tile, wherein adjacent rows/columns of shock absorbing members in the array are staggered.

The previously described shock absorbing mat/tile, wherein each of the shock absorbing members has a plurality of relief formations formed therein configured to accommodate lateral expansion of the shock absorbing member during axial compression thereof.

BRIEF DESCRIPTION OF THE DRAWINGS

Embodiments will now be described more fully with reference to the accompanying drawings in which.

DETAILED DESCRIPTION OF EMBODIMENTS

Figure 1:
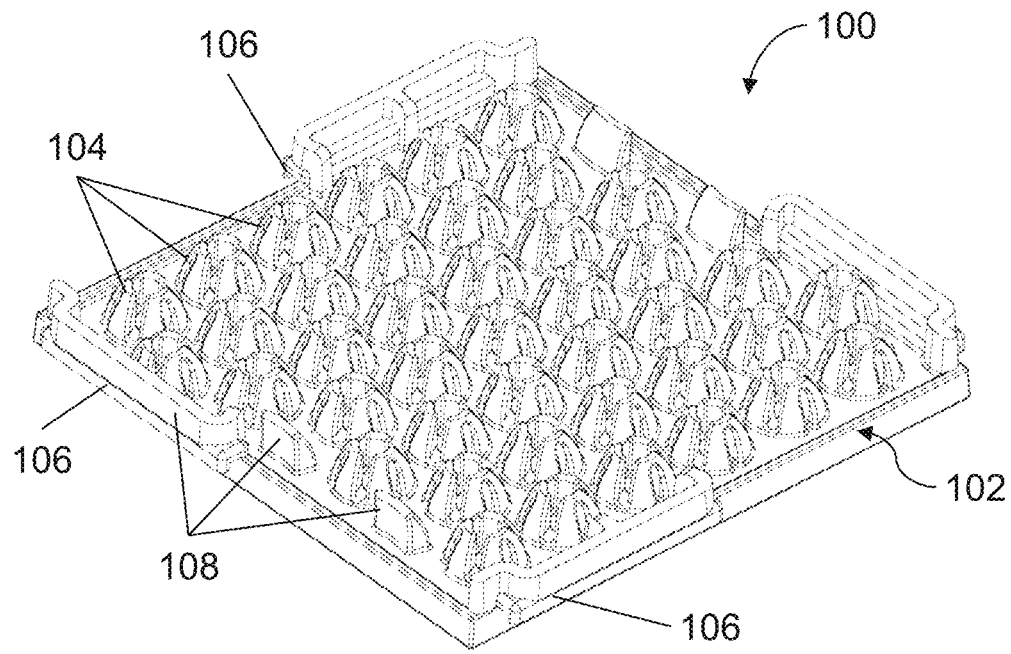
FIG. 1 is an isometric view of a shock absorbing mat/tile taken from the side and from below.
Figure 2:
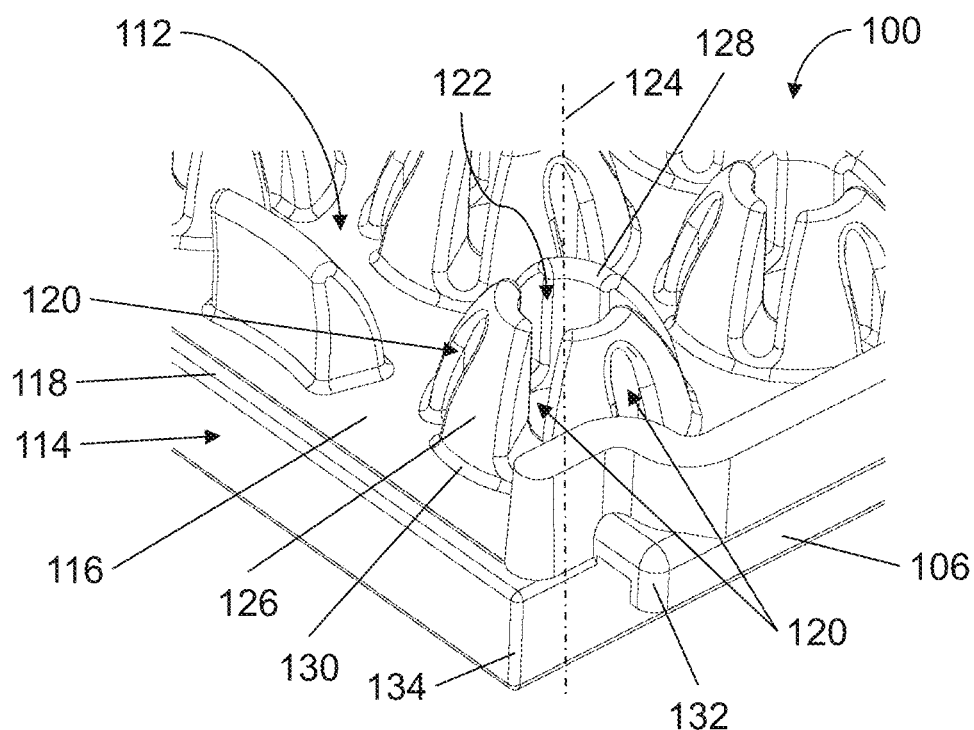
FIG. 2 is a partial enlarged isometric view of a corner of the shock absorbing mat/tile of FIG. 1.
Figure 3:
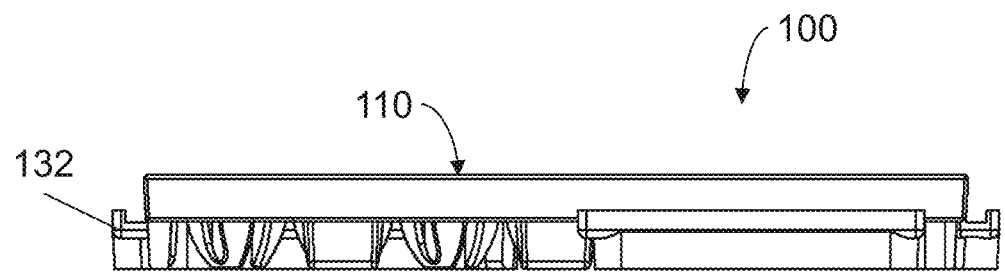
FIG. 3 is an elevational view of the shock absorbing mat/tile of FIG. 1.
Figure 4:
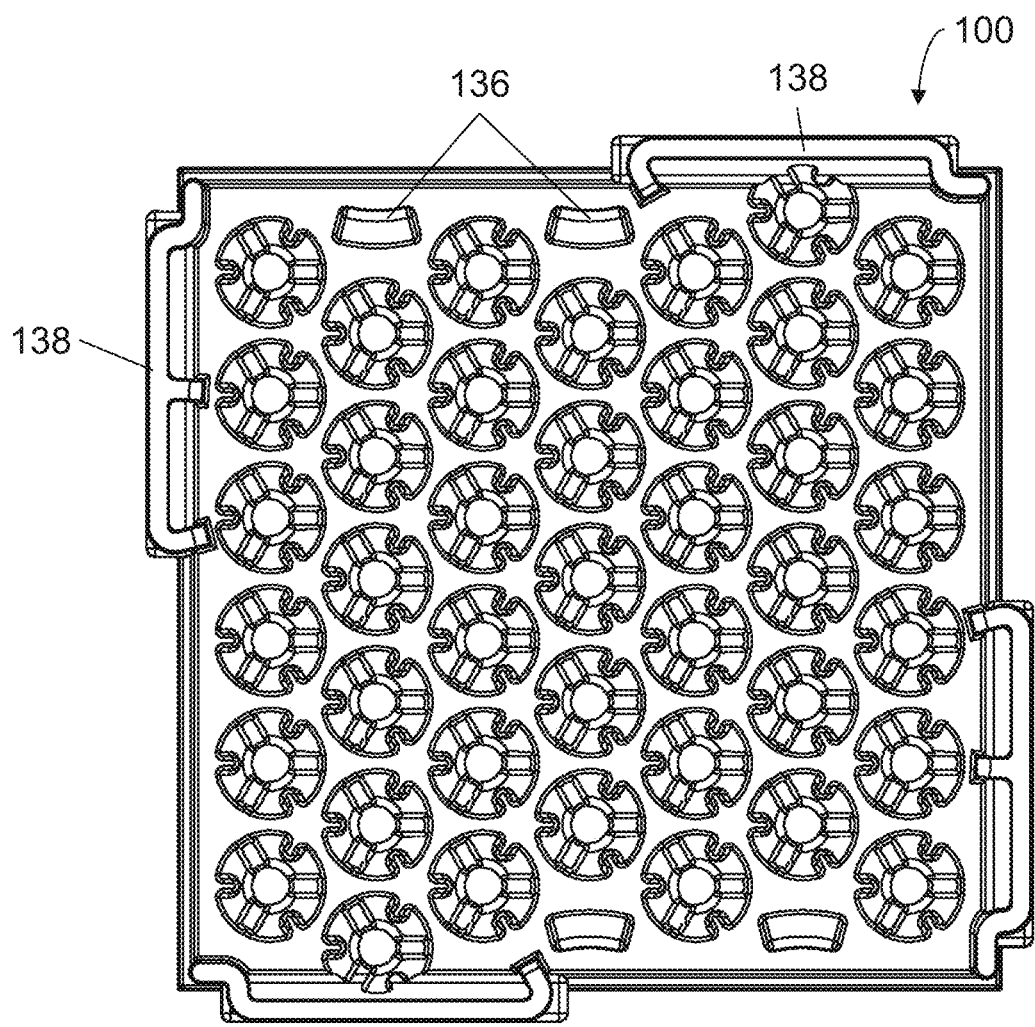
FIG. 4 is a bottom plan view of the shock absorbing mat/tile of FIG. 1.

The foregoing summary, as well as the following detailed description of certain examples will be better understood when read in conjunction with the appended drawings. As used herein, an element or feature introduced in the singular and preceded by the word "a" or "an" should be understood as not necessarily excluding the plural of the elements or features. Further, references to "one example" or "one embodiment" are not intended to be interpreted as excluding the existence of additional examples or embodiments that also incorporate the described elements or features. Moreover, unless explicitly stated to the contrary, examples or embodiments "comprising" or "having" or "including" an element or feature or a plurality of elements or features having a particular property may include additional elements or features not having that property. Also, it will be appreciated that the terms "comprises", "has", "includes" means "including by not limited to" and the terms "comprising", "having" and "including" have equivalent meanings. It will also be appreciated that like reference characters will be used to refer to like elements throughout the description and drawings.

In the following, various embodiments of a shock absorbing mat or tile (hereinafter referred to as "mat" for convenience only) are described. Broadly, each shock absorbing mat comprises a body having a generally planar, major top surface and an opposite major bottom surface, and a plurality of shock absorbing members depending from the bottom surface. At least one of the shock absorbing members has at least one relief formation formed therein. The at least one relief formation is designed, shaped or otherwise configured to accommodate lateral expansion of the shock absorbing member during axial compression thereof. The shock absorbing mat is designed to inhibit or prevent the transmission of vibration and/or noise. The shock absorbing mat can be used in isolation or with other shock absorbing mats to form a floor covering. The size and shape of the shock absorbing mat can be adjusted to suit particular environments in which the shock absorbing mat is used and to suit the desired floor surface area to be covered. Particular non-limiting examples of shock absorbing mats and floor coverings employing the same will now be described.

Turning to FIGS. 1 to 6, an embodiment of a shock absorbing mat is shown and is generally identified by reference character 100. The shock absorbing mat 100 is of unitary construction and is formed of rubber material or other suitable material such as for example natural rubber, styrene-butadiene rubber (SBR), recycled rubber etc. The shock absorbing mat 100 is generally square-shaped and comprises a body 102 having a generally planar, major top surface 110, an opposite major bottom surface 112 and four (4) peripheral side surfaces 114 extending between the top surface 110 and the bottom surface 112. The bottom surface 112 comprises a substantially planar central portion 116 surrounded by a downwardly extending peripheral lip 118.

Figure 5:
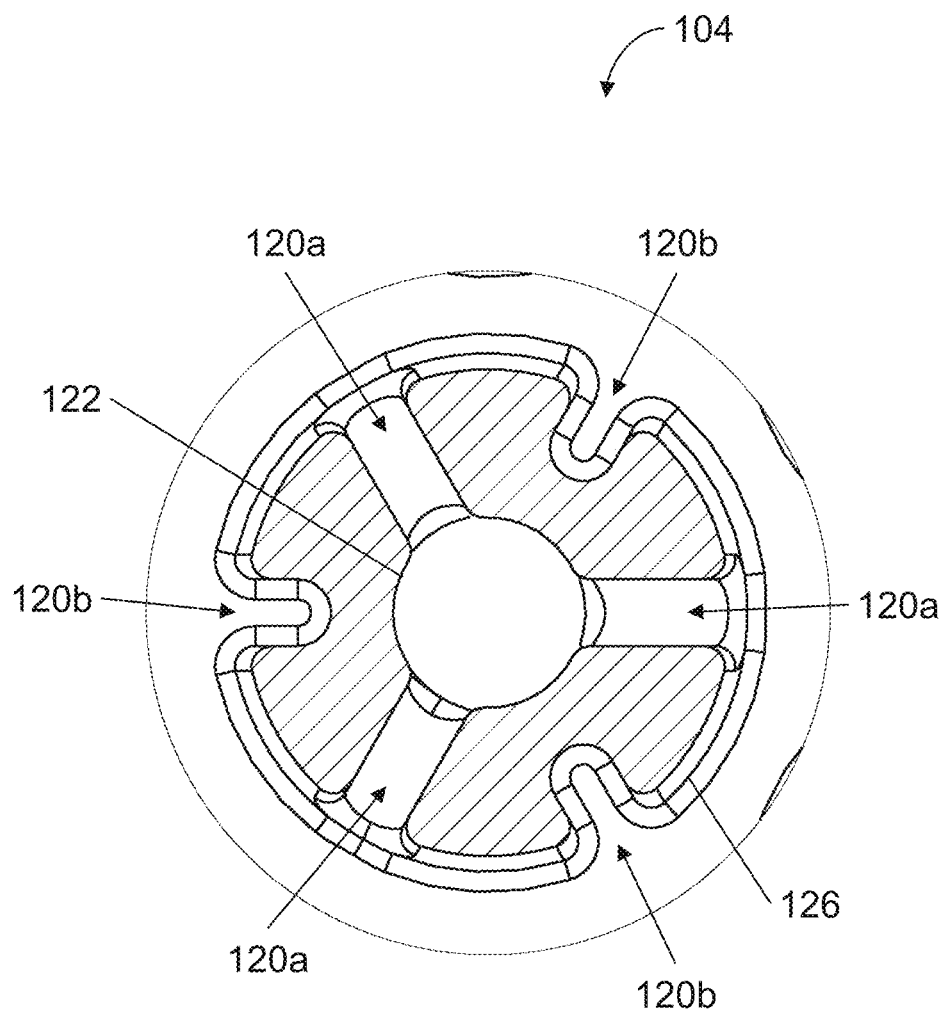
FIG. 5 is a sectional view of a shock absorbing member of the shock absorbing mat/tile of FIG. 1, taken along a horizontal plane.

A plurality of spaced-apart shock absorbing members 104 arranged in an array depend from the central portion 116 of the bottom surface 112. The shock absorbing members 104 of adjacent rows (or columns depending on viewpoint) in the array are offset or staggered. As a result, the shock absorbing members of every other or second row of the array are aligned. In this embodiment, the shock absorbing members 104 are all substantially identical. As can be best seen in FIGS. 2 and 5, each shock absorbing member 104 is roughly or generally parabolic in shape and has relief formations formed therein. In this embodiment, the relief formations are in the form of a plurality of relief grooves 120, in this example six (6) relief grooves 120, and a substantially cylindrical central recess 122. The relief grooves 120 are substantially equally spaced about a central axis 124 of the shock absorbing member 104 and extend radially with respect to the central axis 124. As best shown in FIG. 5, three of the relief grooves 120 are of a type 120a and three of the relief grooves 120 are of a type 120b. The relief grooves 120a extend radially from the central recess 122 to an outer surface 126 of the shock absorbing member 104 and extend completely through the shock absorbing member 104 in the radial direction. The relief grooves 120b extend radially inward from the outer surface 126 towards the central recess 122 but only extend partially through the shock absorbing member 104 in the radial direction. In the axial direction, the relief grooves 120a extend from a distal end or tip 128 of the shock absorbing member 104 towards a base 130 of the shock absorbing member 104. The relief grooves 120b extend in the axial direction from the base 130 towards the tip 128, ending at the outer surface 126 before reaching the tip 128. As will be appreciated, in another embodiment the relief grooves 120b may extend radially outward away from the central recess 122.

Interlocking features or elements 106 are provided about the periphery of the body 102 at spaced locations. Each interlocking element 106 is located adjacent a respective side surface 114 of the body 102 and comprises an upwardly turned, L-shaped protrusion 132 connected to the peripheral lip 118. The protrusion 132 extends laterally outward from the side surface 114 of the body 102 and is adapted or configured to engage a peripheral lip 118 of an adjacent or neighbouring shock absorbing mat 100 to interlock adjacent or neighbouring shock absorbing mats 100 to one another. Each interlocking element 106 extends lengthwise across the side surface 114 from which it projects, beginning near the corner edge 134 of the side surface 114 and terminating adjacent the midpoint of the side surface 114.

Figure 6:
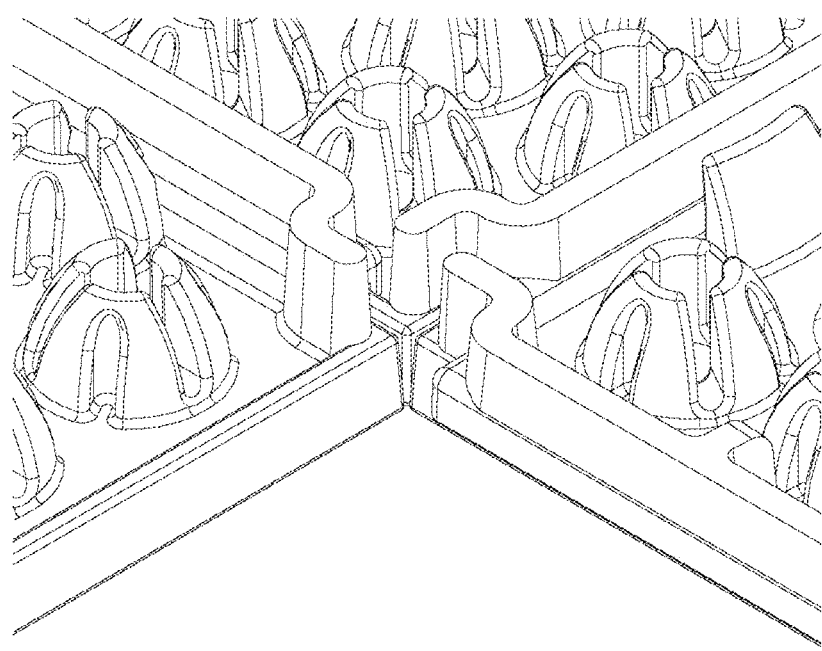
FIG. 6 is a partial enlarged isometric view of the corners of three interlocked shock absorbing mats/tiles of FIG. 1 forming a floor covering.
Figure 7:
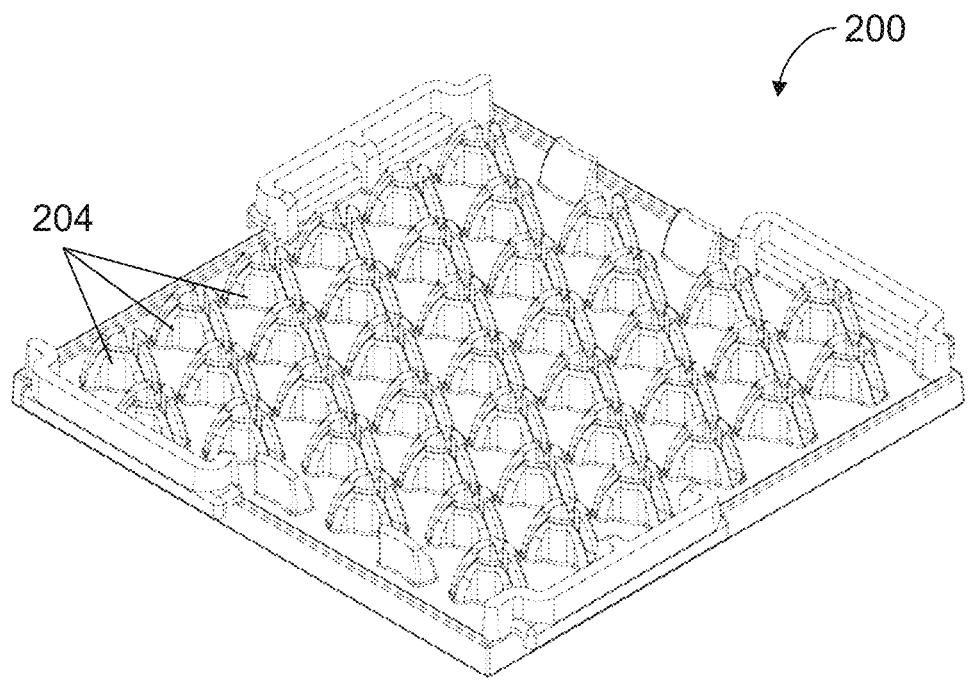
FIG. 7 is an isometric view of another shock absorbing mat/tile taken from the side and from below.
Figure 8:
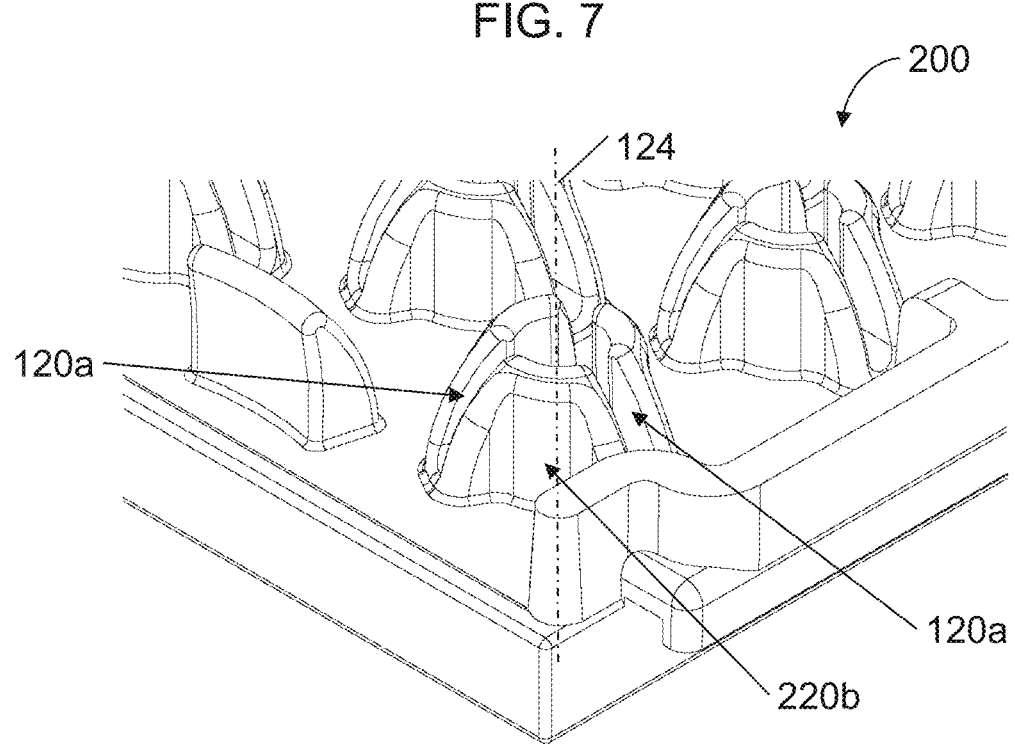
FIG. 8 is a partial enlarged isometric view of a corner of the shock absorbing mat/tile of FIG. 7.
Figure 9:
FIG. 9 is an elevational view of the shock absorbing mat/tile of FIG. 7.
Figure 10:
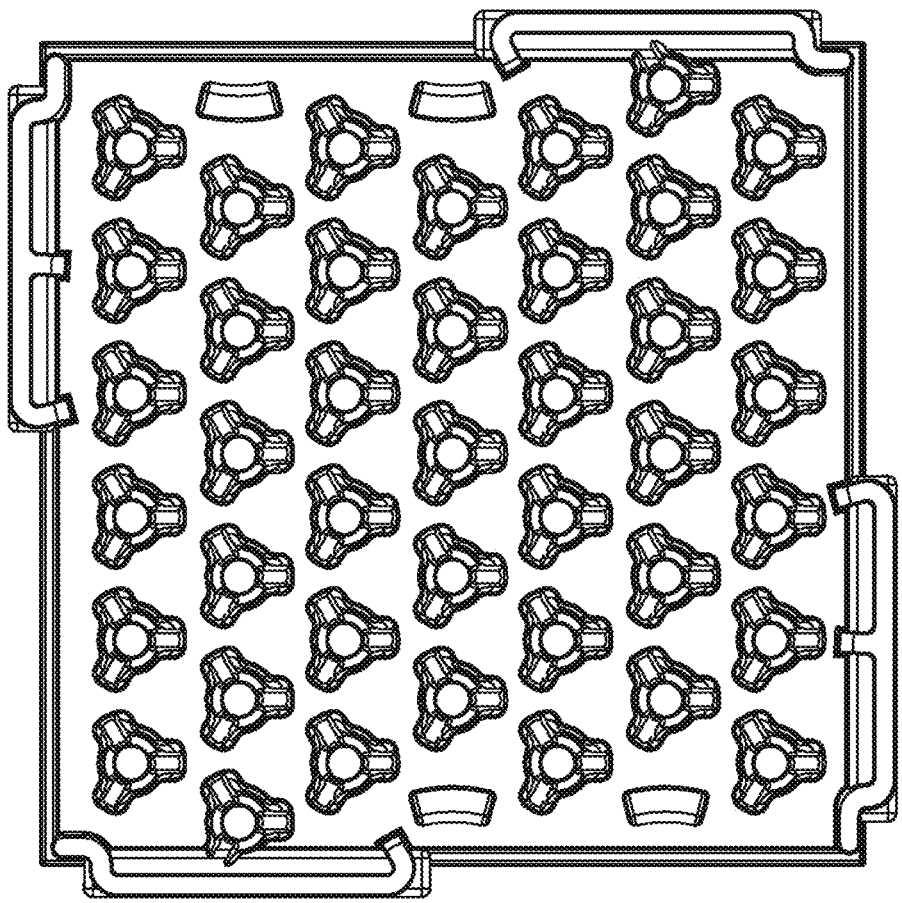
FIG. 10 is a bottom plan view of the shock absorbing mat/tile of FIG. 7.
Figure 11:
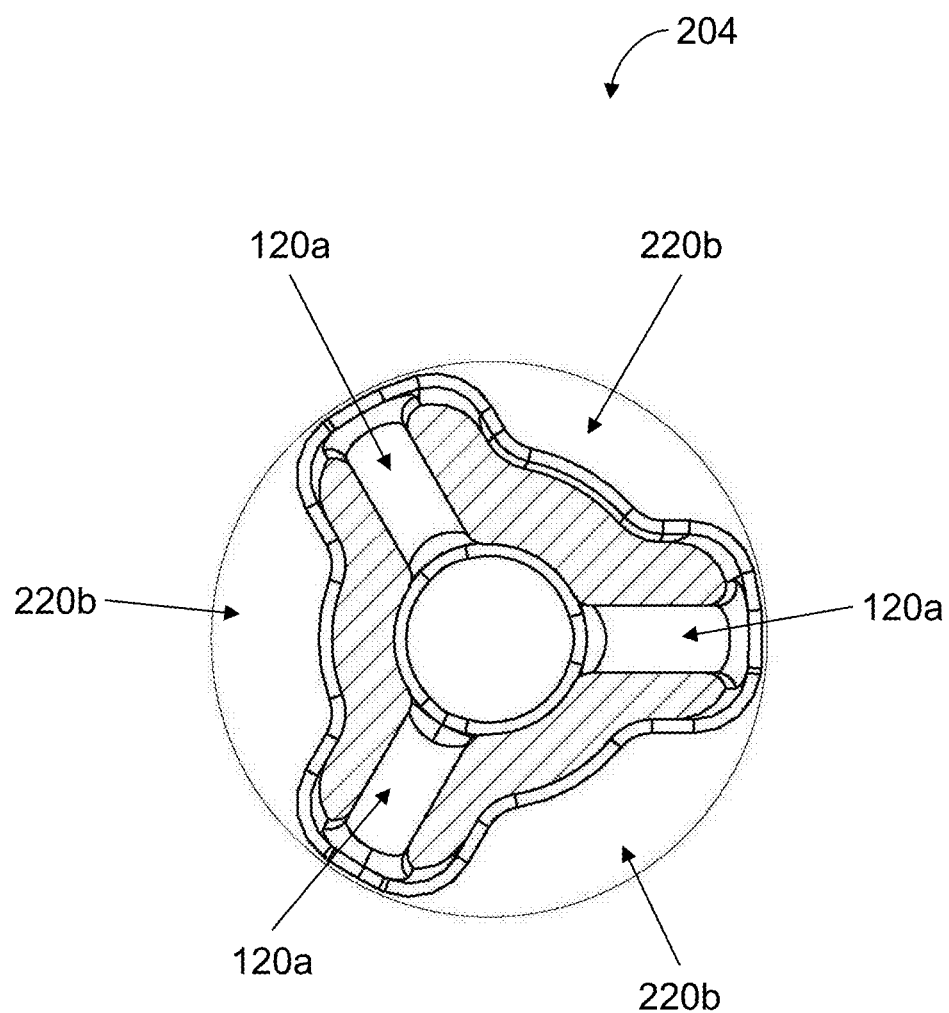
FIG. 11 is a sectional view of a shock absorbing member of the shock absorbing mat/tile of FIG. 7, taken along a horizontal plane.
Figure 12:
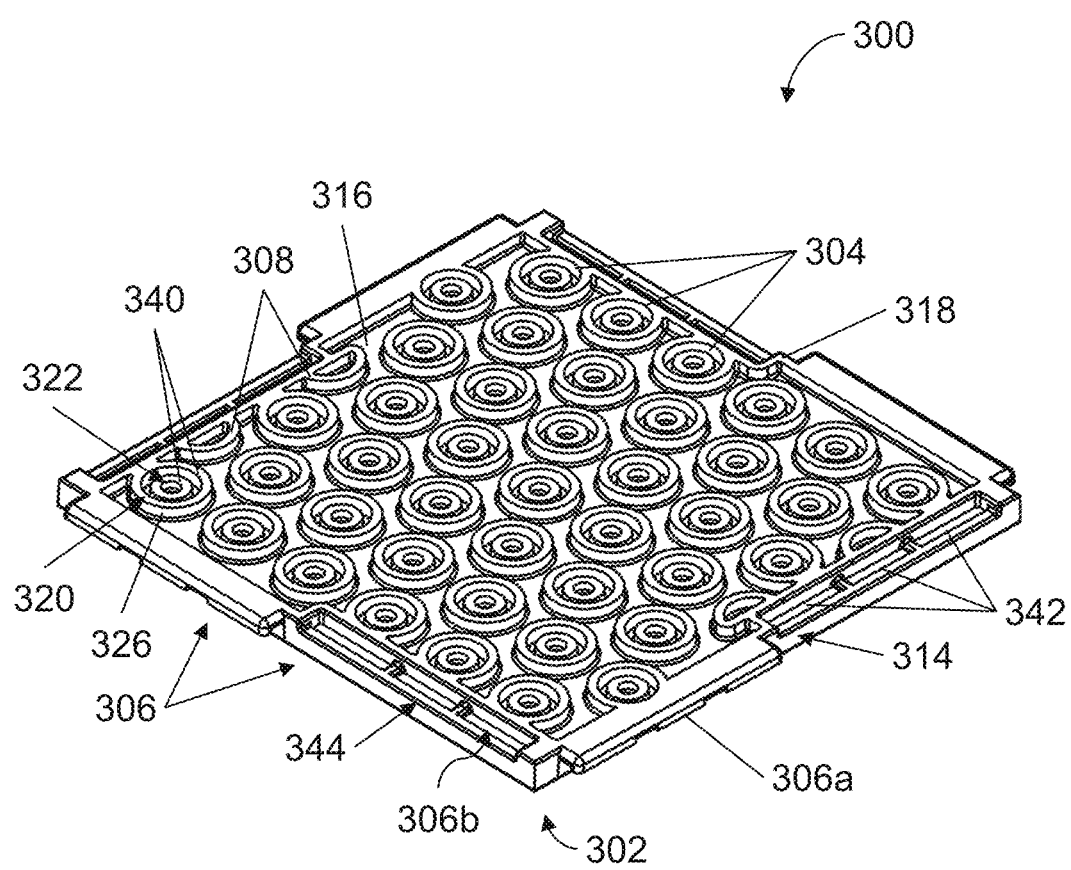
FIG. 12 is an isometric view of another shock absorbing mat/tile taken from the side and from below.
Figure 14:
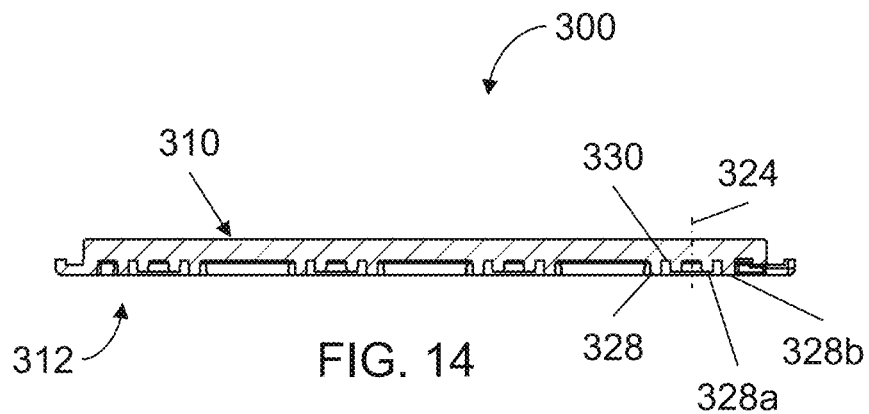
FIG. 14 is a sectional view of the shock absorbing mat/tile of FIG. 13, taken along line 14-14.
Figure 13:
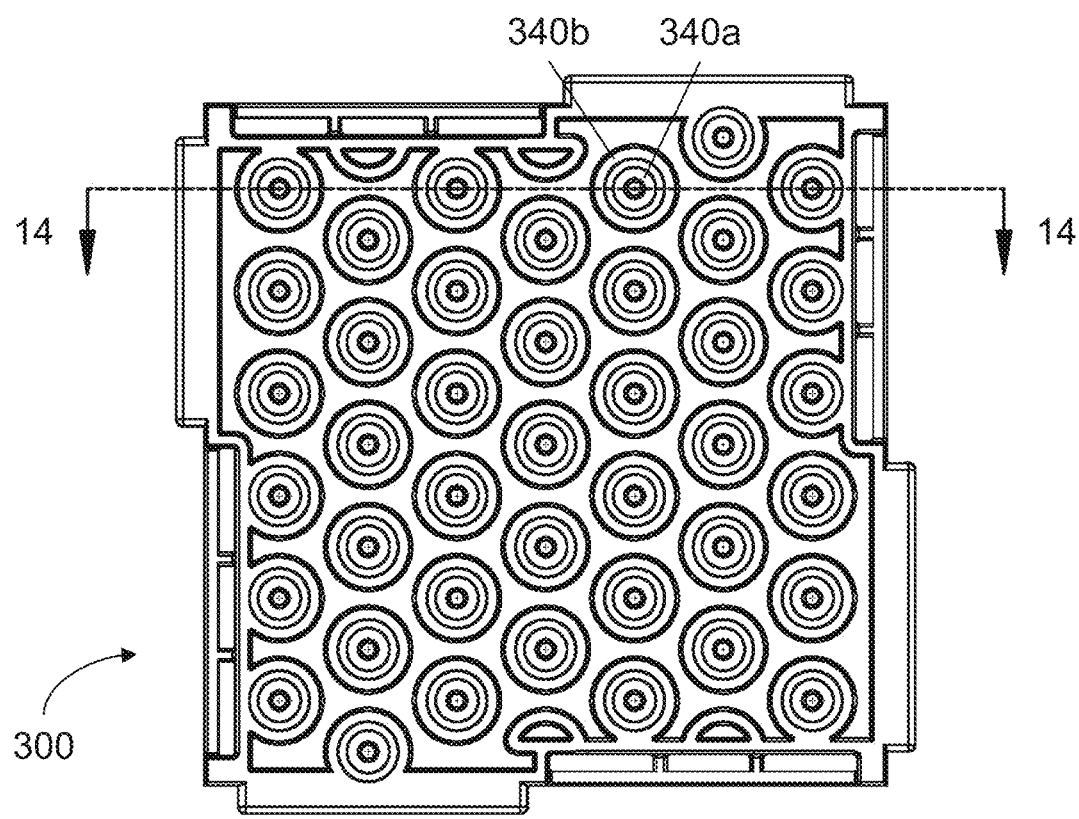
FIG. 13 is a bottom plan view of the shock absorbing mat/tile of FIG. 12.
Figure 15:
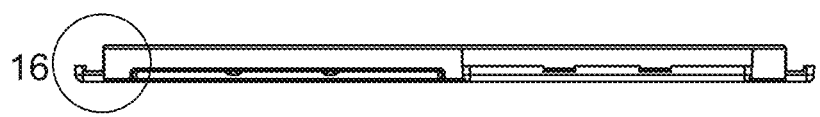
FIG. 15 is an elevational view of the shock absorbing mat/tile of FIG. 12.
Figure 16:
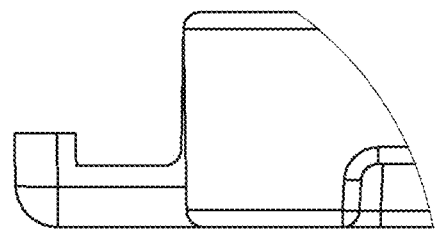
FIG. 16 is a fragmentary view of the shock absorbing mat/tile of FIG. 15, showing detail 16.
Figure 17:
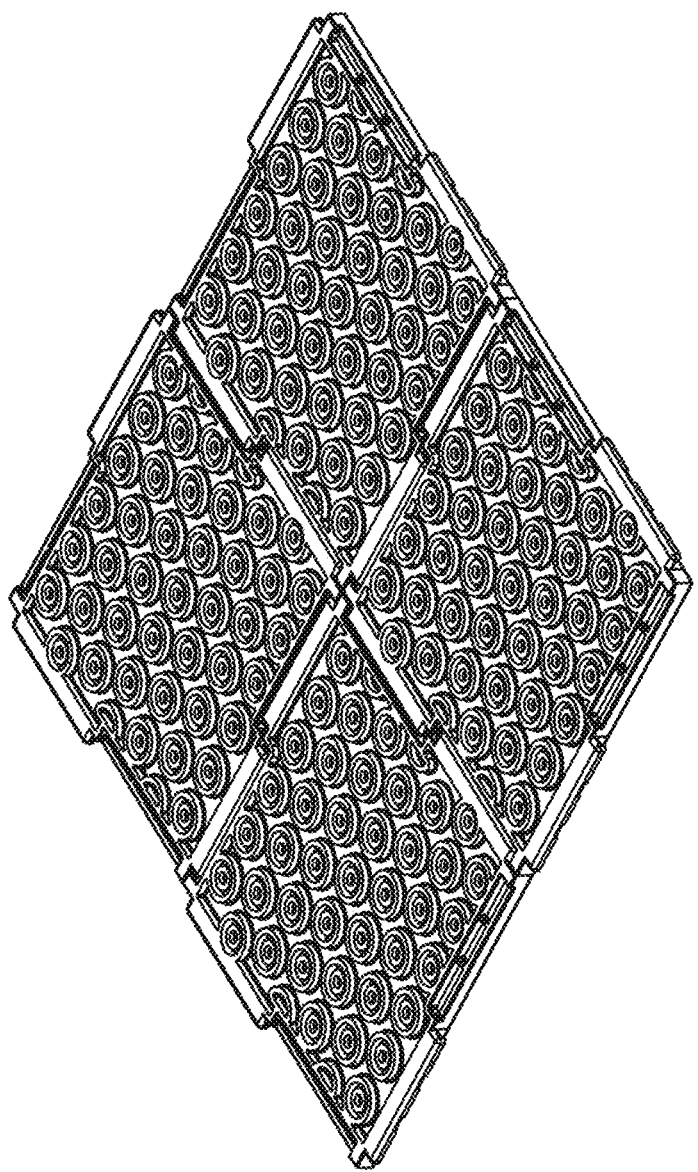
FIG. 17 is an isometric view of four adjacent interlocked shock absorbing mats/tiles forming a floor covering and taken from the side and from below.
Figure 20:
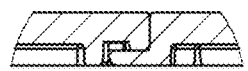
FIG. 20 is a fragmentary view of the shock absorbing mats/tiles of FIG. 19, showing detail 20.
Figure 19:
FIG. 19 is a sectional view of the shock absorbing mats/tiles of FIG. 18, taken along line 19-19.
Figure 18:
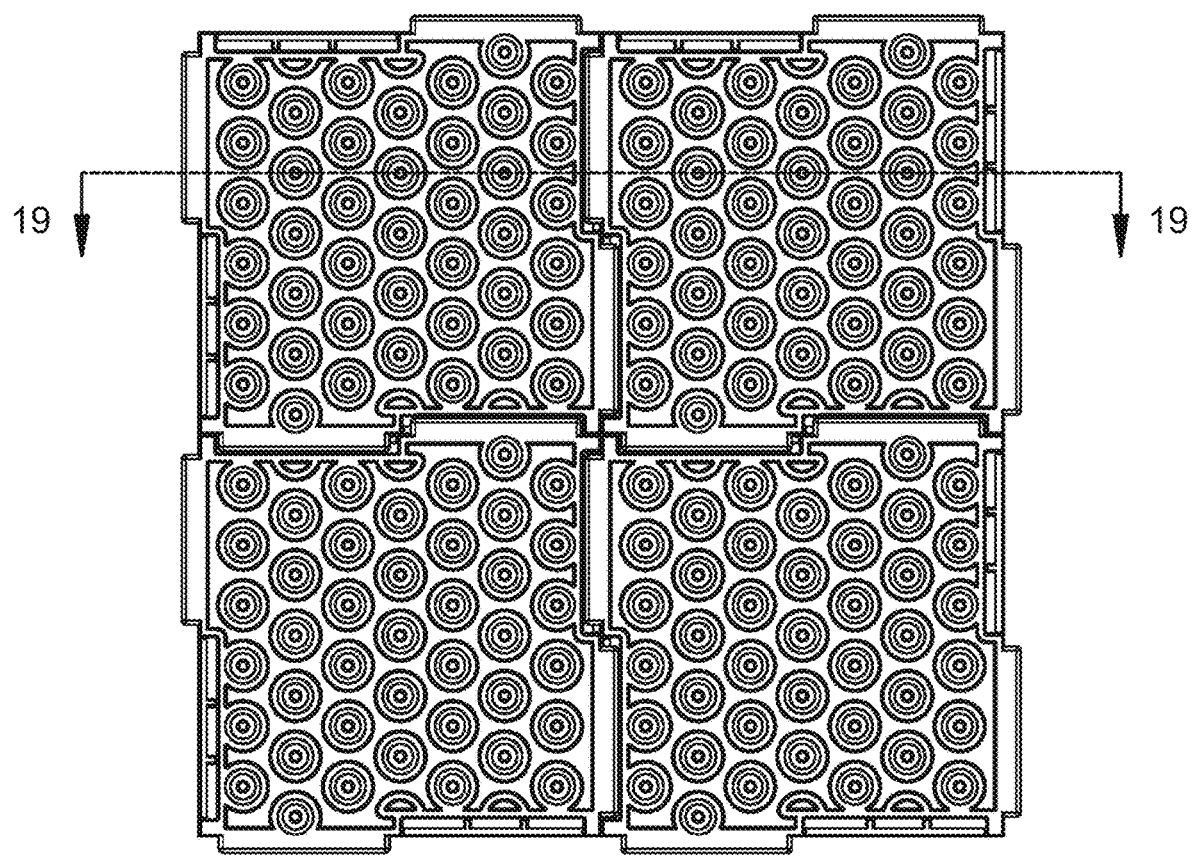
FIG. 18 is a bottom plan view of the shock absorbing mats/tiles FIG. 17.
Figure 21:
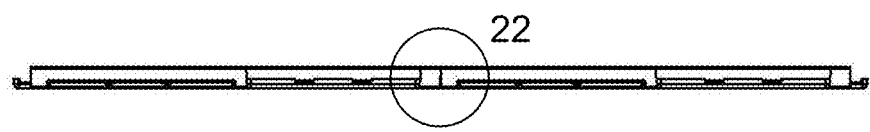
FIG. 21 is an elevational view of the shock absorbing mats/tiles of FIG. 17.
Figure 22:
FIG. 22 is a fragmentary view of the shock absorbing mats/tiles of FIG. 21, showing detail 22.
Figure 23:
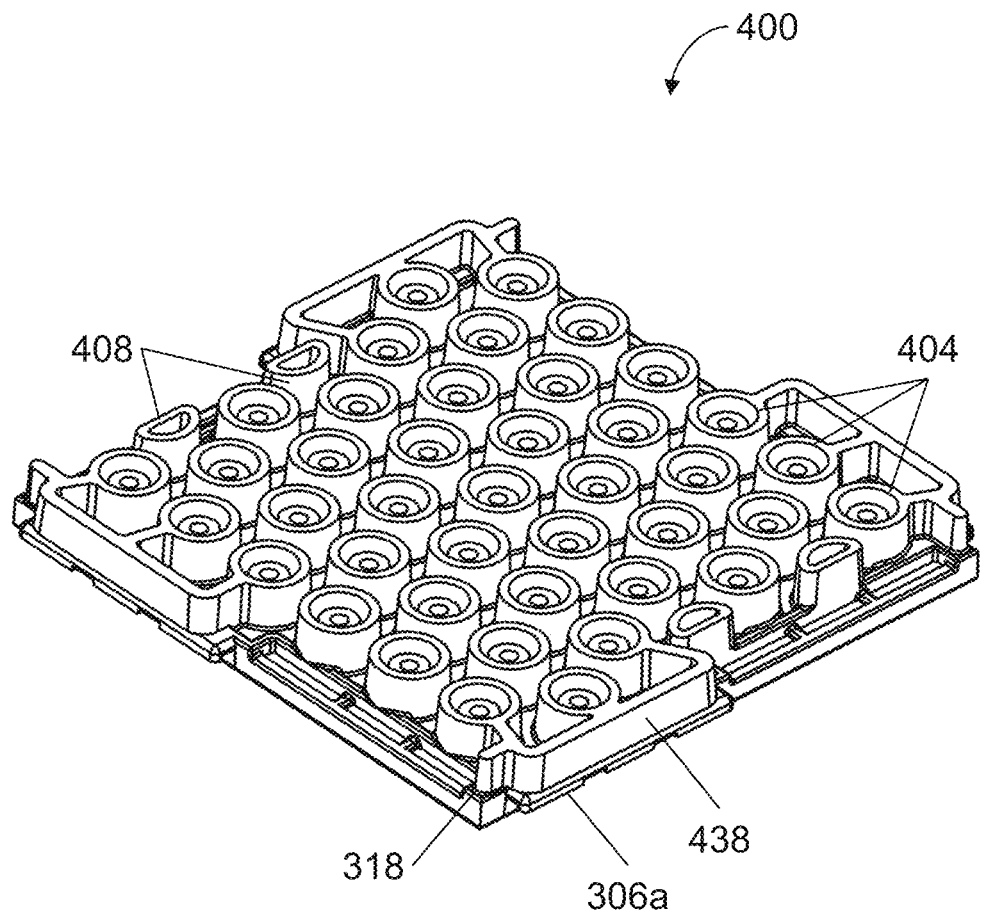
FIG. 23 is an isometric view of another shock absorbing mat/tile taken from the side and from below.
Figure 25:
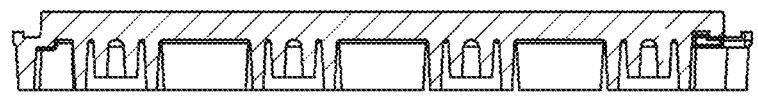
FIG. 25 is a sectional view of the shock absorbing mat/tile of FIG. 24, taken along line 25-25.
Figure 24:
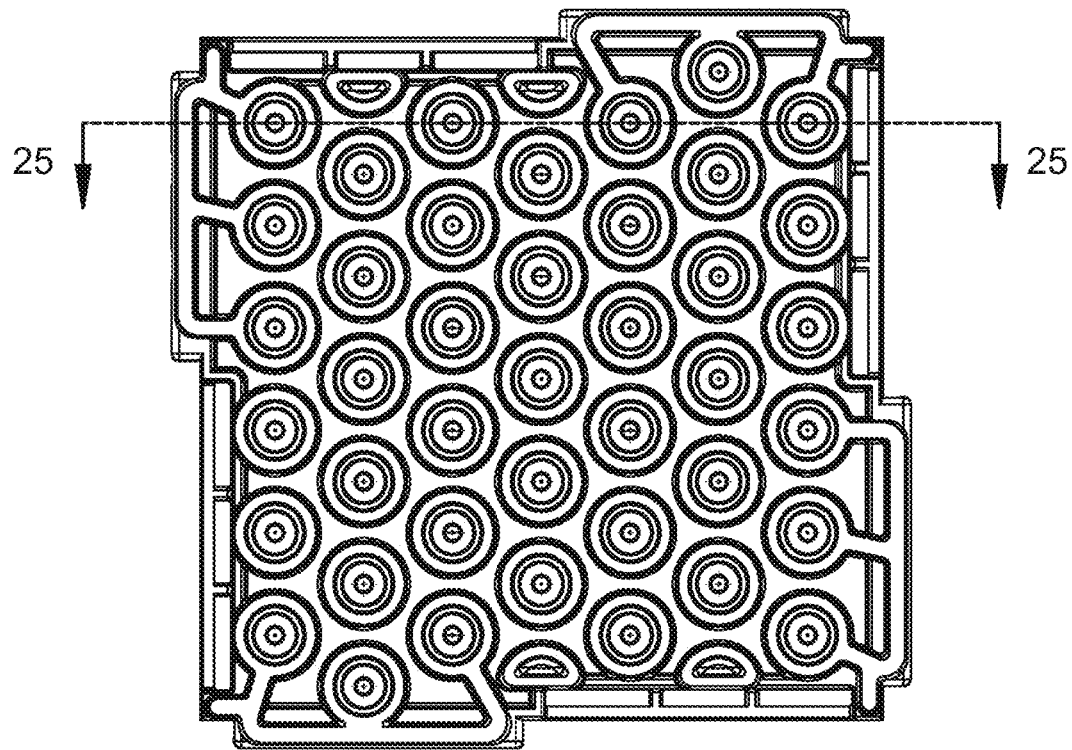
FIG. 24 is a bottom plan view of the shock absorbing mat/tile of FIG. 23.
Figure 26:
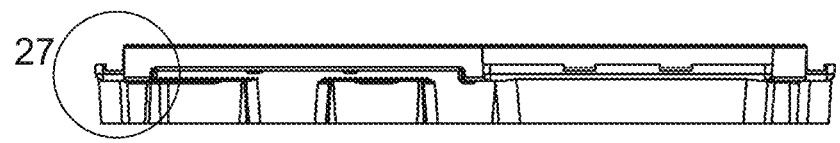
FIG. 26 is an elevational view of the shock absorbing mat/tile of FIG. 23.
Figure 27:
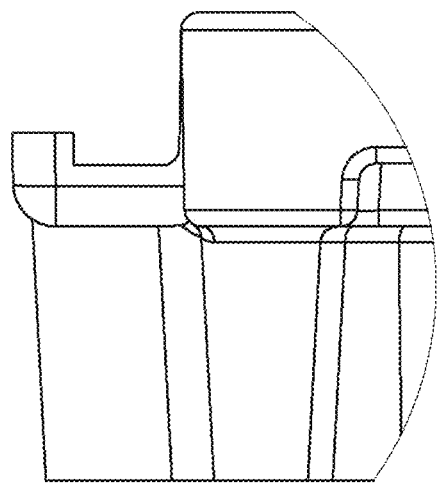
FIG. 27 is a fragmentary view of the shock absorbing mat/tile of FIG. 26, showing detail 27.
Figure 28:
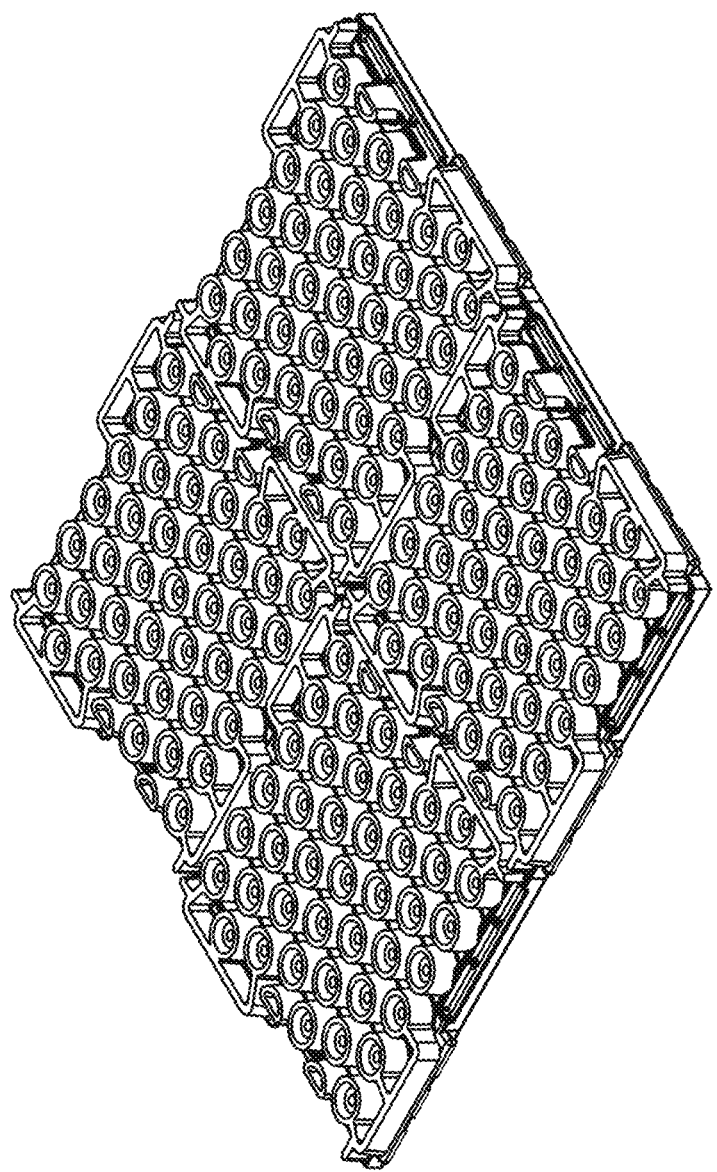
FIG. 28 is an isometric view of four adjacent interlocked shock absorbing mats/tiles forming a floor covering and taken from the side and from below.
Figure 31:
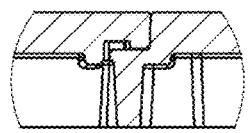
FIG. 31 is a fragmentary view of the shock absorbing mats/tiles of FIG. 30, showing detail 31.
Figure 30:
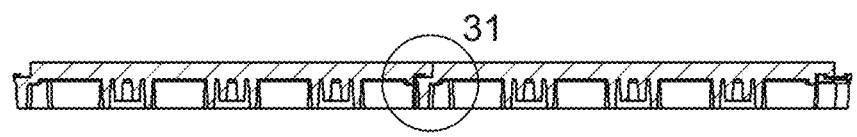
FIG. 30 is a sectional view of the shock absorbing mats/tiles of FIG. 29, taken along line 30-30.
Figure 29:
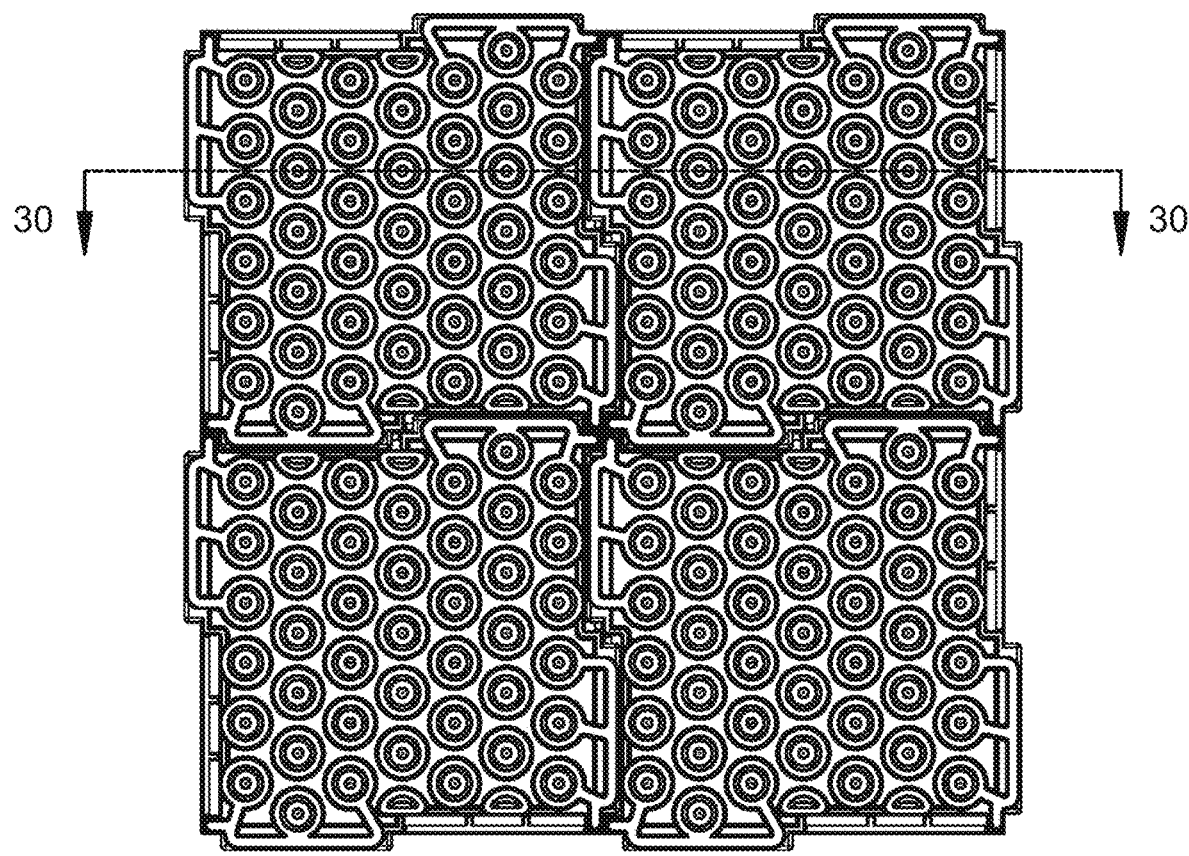
FIG. 29 is a bottom plan view of the shock absorbing mats/tiles of FIG. 28.
Figure 32:
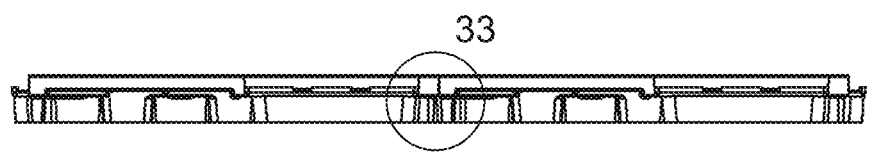
FIG. 32 is an elevational view of the shock absorbing mats/tiles of FIG. 28.
Figure 33:
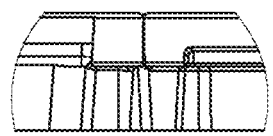
FIG. 33 is a fragmentary view of the shock absorbing mats/tiles of FIG. 32, showing detail 33.
Figure 34:
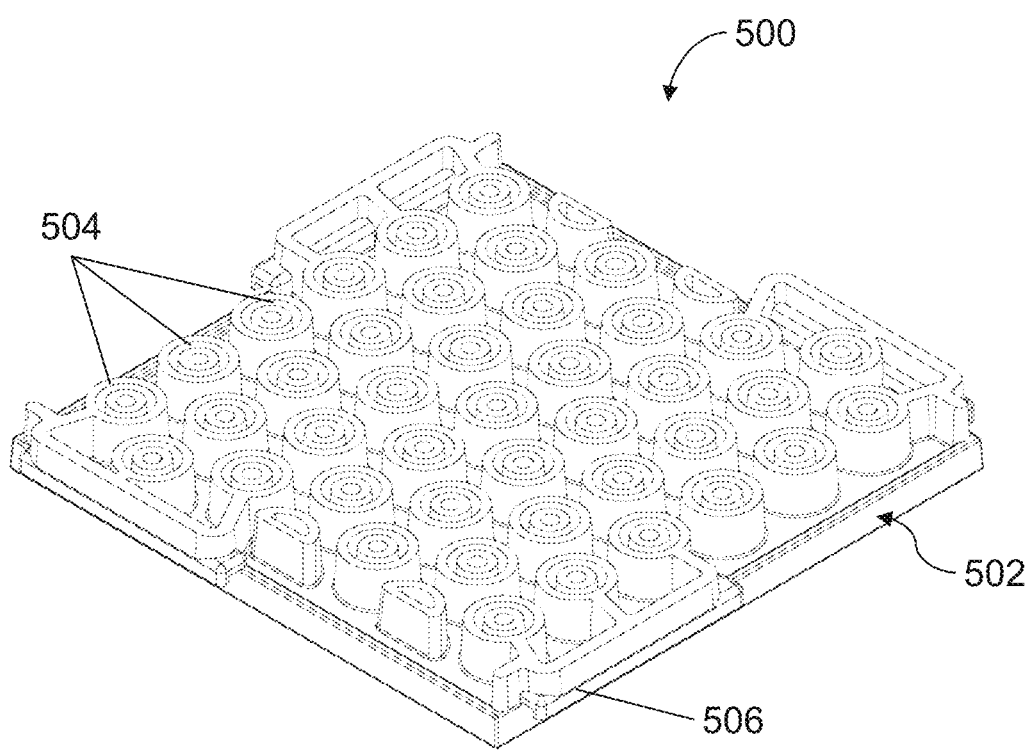
FIG. 34 is an isometric view of another shock absorbing mat/tile taken from the side and from below.
Figure 35:
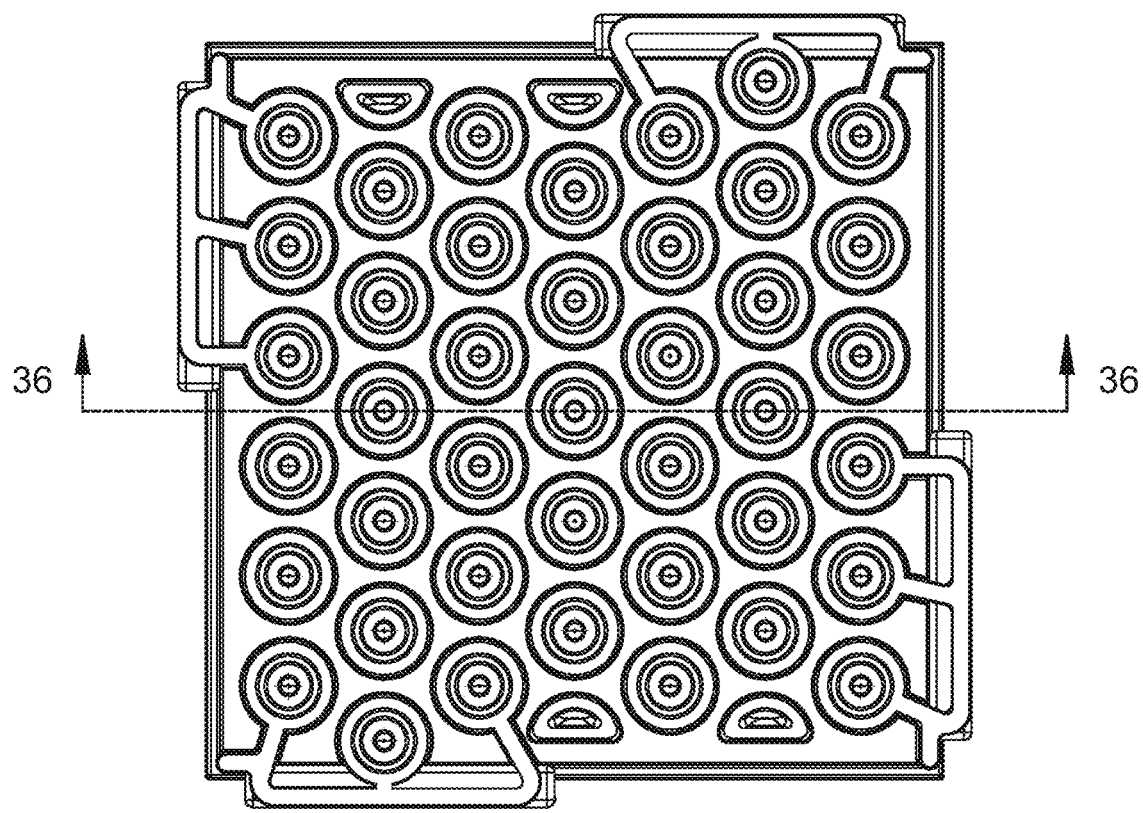
FIG. 35 is a bottom plan view of the shock absorbing mat/tile of FIG. 34.
Figure 36:
FIG. 36 is a sectional view of the shock absorbing mat/tile of FIG. 35, taken along line 36-36.
Figure 37:
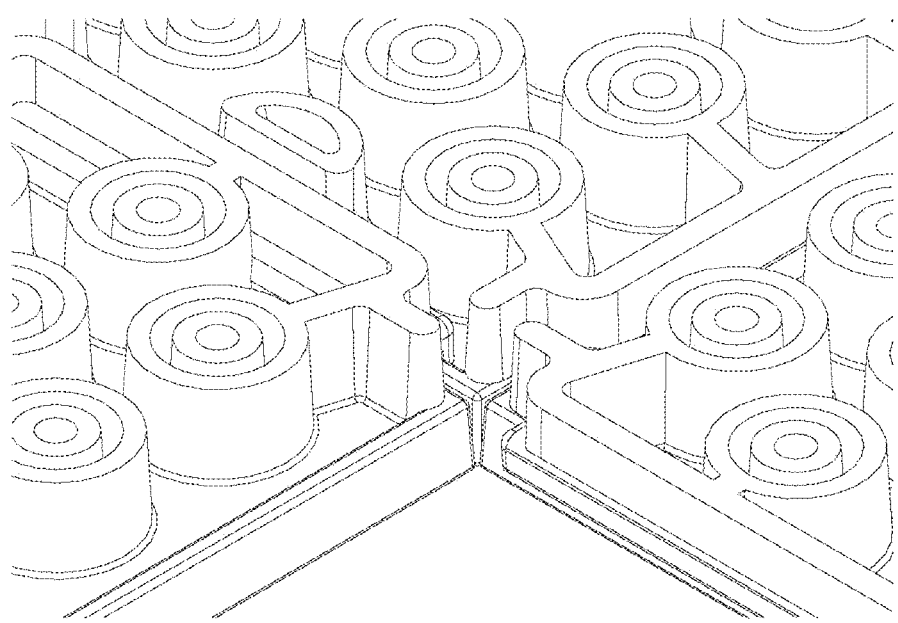
FIG. 37 is a partial enlarged isometric view of corners of three adjacent interlocked shock absorbing mats/tiles of FIG. 34 forming a floor covering.

Supports 108 in the form of support posts 136 and support ribs 138 also depend from the body 102. Each support post 136 is generally wave-shaped and depends from the central portion 116 of the bottom surface 112 of the body 102. The support posts 136 are located adjacent the edges of the bottom surface 112 in gaps between the shock absorbing members 104 and the peripheral lip 118. Each support rib 138 has a generally serpentine wall-like shape and extends downwardly from an interlocking element 106, the adjacent peripheral lip 118 and the central portion 116. The supports 108 reinforce areas of the shock absorbing mat 100 devoid of the shock absorbing members 104, such as the corners (as shown in FIG. 6) and the edges of the shock absorbing mat 100, to provide stiffness uniformity across the top surface 110 of the shock absorbing mat 100.

When a force with a downward component is applied to the top surface 110 of the shock absorbing mat 100 as a result of an impact, the shock absorbing members 104 compress axially and expand laterally to provide shock absorption. The relief formations, specifically the relief grooves 120 and central recess 122 of each shock absorbing member 104, provide space to accommodate the lateral expansion during axial compression and assist to reduce stresses within each shock absorbing member 104. Additionally, as will be appreciated by one of ordinary skill in the art, the shock absorption characteristics of the shock absorbing mat 100 will depend on the shape and material of the shock absorbing members 104, among other factors. Providing the relief grooves 120 and the central recess 122 within the shock absorbing members 104 allows for greater customizability and control of these shock absorbing characteristics.

During use, one or more of the shock absorbing mats 100 are placed on a base surface such as for example a floor surface. In the event that more than one shock absorbing mat 100 is used, adjacent or neighbouring shock absorbing mats 100 are connected to one another via respective interlocking elements 106 and peripheral lips 118 (see FIG. 6). The shock absorbing mats 100 provide a substantially uniform and planar working top surface that is supported above the base surface by the shock absorbing members 104 and supports 108. As such, the base surface is provided with improved shock absorption characteristics and as such the transmission of noise and vibration through the base surface is mitigated.

Turning to FIGS. 7 to 11, another embodiment of a shock absorbing mat is shown and is generally identified by reference character 200. The shock absorbing mat 200 is similar to the shock absorbing mat 100 previously described, with the exception of the shock absorbing members 204. In this embodiment, the shock absorbing members 204 have wider relief grooves 220b that are circumferentially expanded about the central axis 124 to extend substantially between the relief grooves 120a as compared to relief grooves 120b of the shock absorbing members 104. The shock absorbing members 204 are otherwise identical to the shock absorbing members 104 previously described.

Turning to FIGS. 12 to 22, another embodiment of a shock absorbing mat is shown and is generally identified by reference character 300. The mat 300 is of unitary construction and is formed of rubber material or other suitable material such as for example natural rubber, styrene-butadiene rubber (SBR), recycled rubber etc. The shock absorbing mat 300 is generally square-shaped and comprises a body 302 having a generally planar, major top surface 310, an opposite bottom surface 312 and four (4) peripheral side surfaces 314 extending between the top surface 310 and the bottom surface 312. The bottom surface 312 comprises a substantially planar central portion 316 surrounded by a downwardly extending peripheral lip 318. A cutout 344 is provided in each side surface 314 of the body 302. At each cutout 344, a plurality of detents 342 is formed in the bottom surface 312.

A plurality of spaced-apart shock absorbing members 304 arranged in an array depend from the central portion 316 of the bottom surface 312. The shock absorbing members 304 of adjacent rows (or columns depending on viewpoint) in the array are offset or staggered. As a result, the shock absorbing members of every other or second row of the array are aligned. In this embodiment, each shock absorbing member 304 is substantially cylindrical in shape and has relief formations formed therein. In this embodiment, the relief formations are in the form of a relief groove 320 and a substantially cylindrical central recess 322. The relief groove 320 extends circumferentially about a central axis 324 of the shock absorbing member 304 and is concentric with the central recess 322 and an outer surface 326 of the shock absorbing member 304. In the axial direction, the relief groove 320 extends from the distal end 328 of the shock absorbing member 304 to the base 330 of the shock absorbing member 304. The relief groove 320 and central recess 322 divide the shock absorbing member 304 into two (2) annular portions or cylindrical rings 340, namely inner annular portion 340a and outer annular portion 340b. A distal end 328a of the inner annular portion 340a is recessed with respect to a distal end 328b of the outer annular portion 340b.

A pair of interlocking elements 306 extends from each side surface 314 of the body 302. Each pair of interlocking elements 306 comprises an outwardly extending, L-shaped projection 306a and an inwardly extending complimentary void 306b. The complimentary void 306b is delimited by the peripheral lip 318, the plurality of detents 342, the cutout 344 and the portion of the bottom surface 312 at the cutout 344. The projection 306a is adapted or configured to pass through the cutout 344 of an adjacent or neighbouring shock absorbing mat 300 and an upwardly turned end of the projection 306a is crenulated to engage the detents 342 of the adjacent or neighbouring shock absorbing mat 300, to interlock the shock absorbing mats 300 to one another thereby to form a floor covering.

Supports in the form of support posts 308 depend from the body 302. The supports posts 308 are hollow and generally semi-circular in shape. Each support post 308 extends downwardly from the central portion 316 of the bottom surface 312 and abuts the peripheral lip 318. The supports posts 308 are located or positioned to provide additional reinforcement in areas of the shock absorbing mat 300 devoid of the shock absorbing members 304 and the peripheral lip 318, to provide stiffness uniformity across the top surface of the shock absorbing mat 300.

When a force with a downward component is applied to the top surface 310 of the shock absorbing mat 300 as a result of an impact, the shock absorbing members 304 compress axially and expand laterally to provide shock absorption. The relief groove 320 and central recess 322 of each shock absorbing member 304 provide space to accommodate this lateral expansion during axial compression and assist to reduce stresses within each shock absorbing member 304. Additionally, as will be appreciated by one of ordinary skill in the art, the shock absorption characteristics of the shock absorbing mat 300 will depend on the shape and material of the shock absorbing members 304, among other factors. Providing the relief groove 320 and the central recess 322 within each shock absorbing members 304 provides for greater customizability and control of these shock absorbing characteristics.

During use, one or more of the shock absorbing mats 300 are placed on a base surface such as for example a floor surface. In the event that more than one shock absorbing mat 300 is used, adjacent or neighbouring shock absorbing mats 300 are connected to one another via respective interlocking elements 306 (see FIGS. 17 to 22). The shock absorbing mats 300 provide a substantially uniform and planar working top surface that is supported above the base surface by the depending features of the shock absorbing mats 300. As such, the base surface is provided with improved shock absorption characteristics and as such the transmission of noise and vibration through the base surface is mitigated.

Turning to FIGS. 23 to 33, another embodiment of a shock absorbing mat is shown and is generally identified by reference character 400. The shock absorbing mat 400 is similar to shock absorbing mat 300 previously described with a few exceptions. In this embodiment, the shock absorbing members 404 and the support posts 408 have been extended axially, and a plurality of support ribs 438 has been added as compared to shocking absorbing mat 300. The support ribs 438 extend downwardly from the projections 306a and the peripheral wall 318 and connect to the shock absorbing members 404 adjacent the projections 306a.

Turning to FIGS. 34 to 37, another embodiment of a shock absorbing mat is shown and is generally identified by reference character 500. The shock absorbing mat 500 is similar to shock absorbing mat 400 previously described with a few exceptions. In this embodiment, the body 502 and interlocking elements 506 are identical to the body 102 and interlocking elements 106 of shock absorbing mat 100 previously described, and the inner annular portion of each shock absorbing member 504 has been extended to be flush with the outer annular portion.

Figure 38:
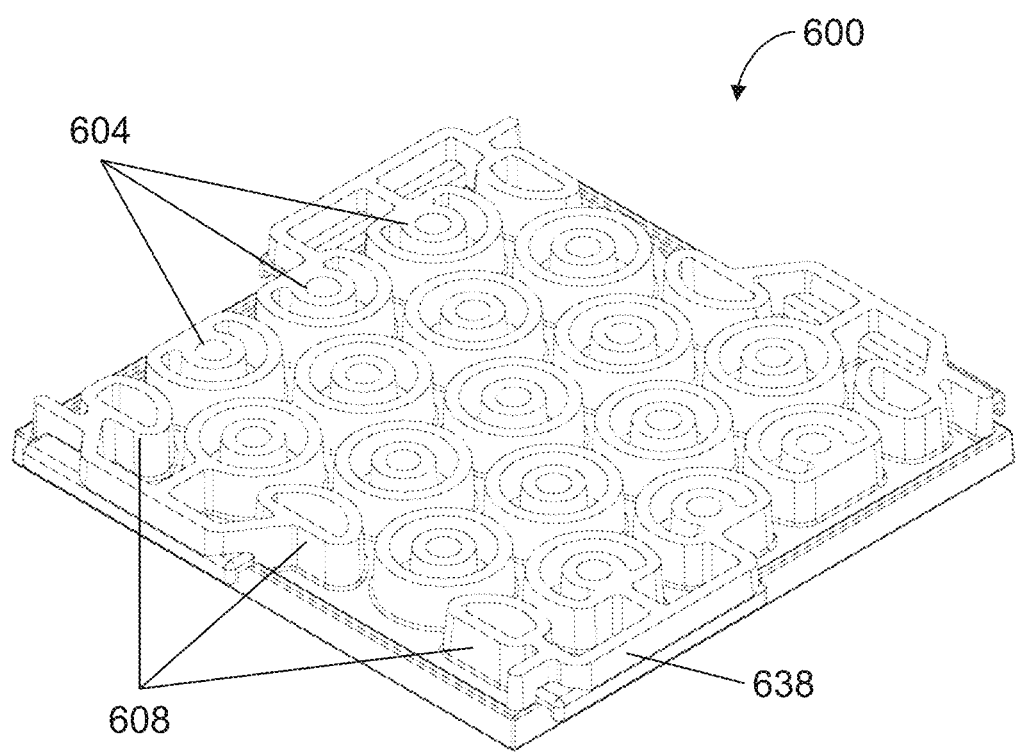
FIG. 38 is an isometric view of another shock absorbing mat/tile taken from the side and from below.
Figure 39:
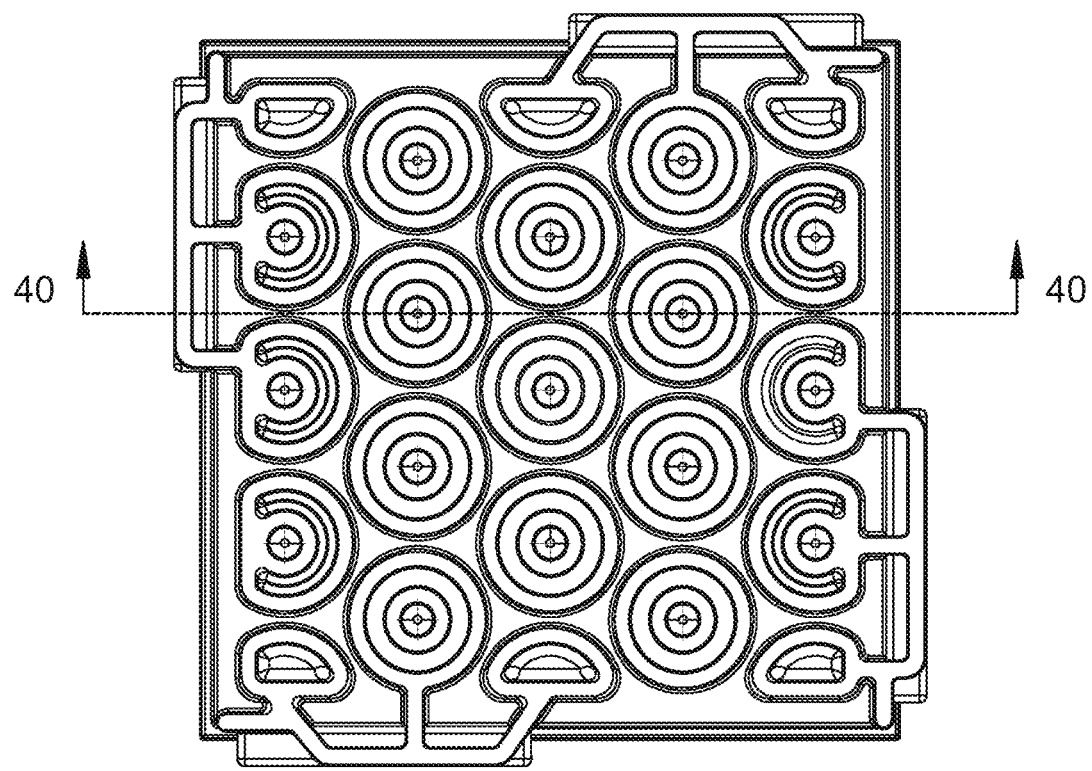
FIG. 39 is a bottom plan view of shock absorbing mat/tile of FIG. 38.
Figure 40:
FIG. 40 is a sectional view of the shock absorbing mat/tile of FIG. 39, taken along line 40-40.

Turning to FIGS. 38 to 40, another embodiment of a shock absorbing mat is shown and is generally identified by reference character 600. The shock absorbing mat 600 is similar to shock absorbing mat 500 previously described with a few exceptions. In this embodiment, the shock absorbing members 604 have been increased in diameter and reduced in number, the support posts 608 have been increased in diameter and relocated, and the support ribs 638 have been re-pathed as compared to shock absorbing mat 500. The shock absorbing members 604 and support posts 608 adjacent the periphery of the mat 600 are also truncated to accommodate space restrictions.

Figure 41:
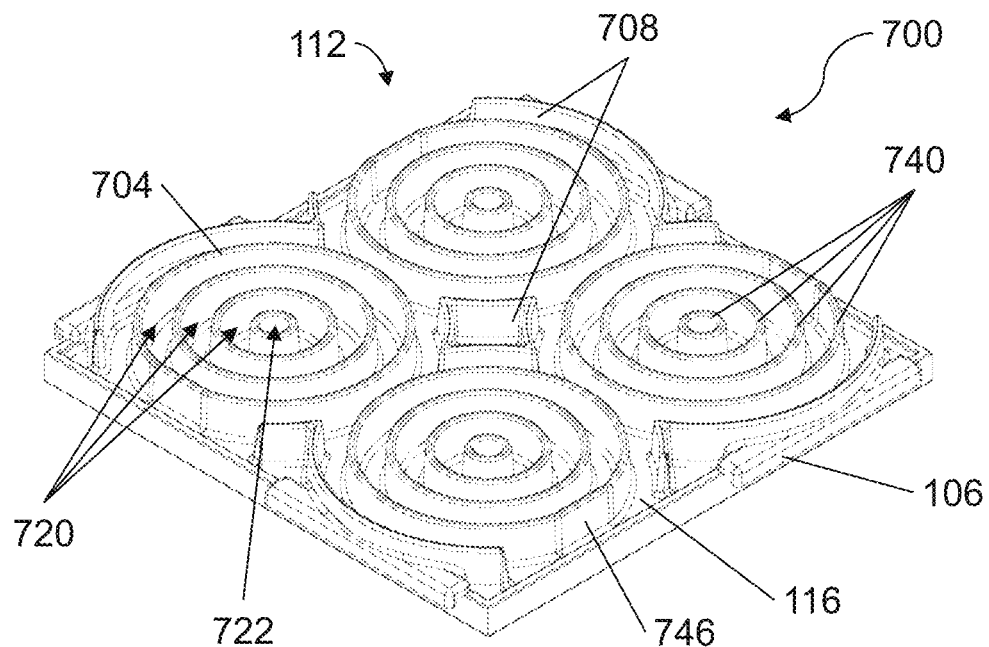
FIG. 41 is an isometric view of another shock absorbing mat/tile taken from the side and from below.

Turning to FIG. 41, another embodiment of a shock absorbing mat is shown and is generally identified by reference character 700. Shocking absorbing mat 700 is similar to shock absorbing mat 100 previously described, with a few exceptions. In this embodiment, the shock absorbing members 704 and supports 708 have different configurations as compared to shock absorbing mat 100. The shock absorbing members 704, which depend from the central portion 116 of the bottom surface 112, are fewer in number and are arranged in a 4×4 array. Each shock absorbing member 704 is substantially cylindrical in shape and has relief formations formed or provided therein. In this embodiment, the relief formations are in the form of a plurality of relief grooves 720 and a substantially cylindrical central recess 722. The relief grooves 720 extend circumferentially about a central axis of the shock absorbing member 704 and are concentric with each other and the central recess 722. The relief grooves 720 and central recess 722 divide the shock absorbing member 704 into a plurality of annular portions 740. Segments 746 of the annular portions 740 adjacent the periphery of the shock absorbing mat 704 are straightened to accommodate space restrictions. The supports 708 comprise a central post and a plurality of peripheral ribs resembling check marks, all of which follow the contours of adjacent shock absorbing members 704. The central post is hollow and extends downwardly from the central portion 116 of the bottom surface 112 and the peripheral ribs extend downwardly from the central portion 116 and the interlocking elements 106.

Figure 42:
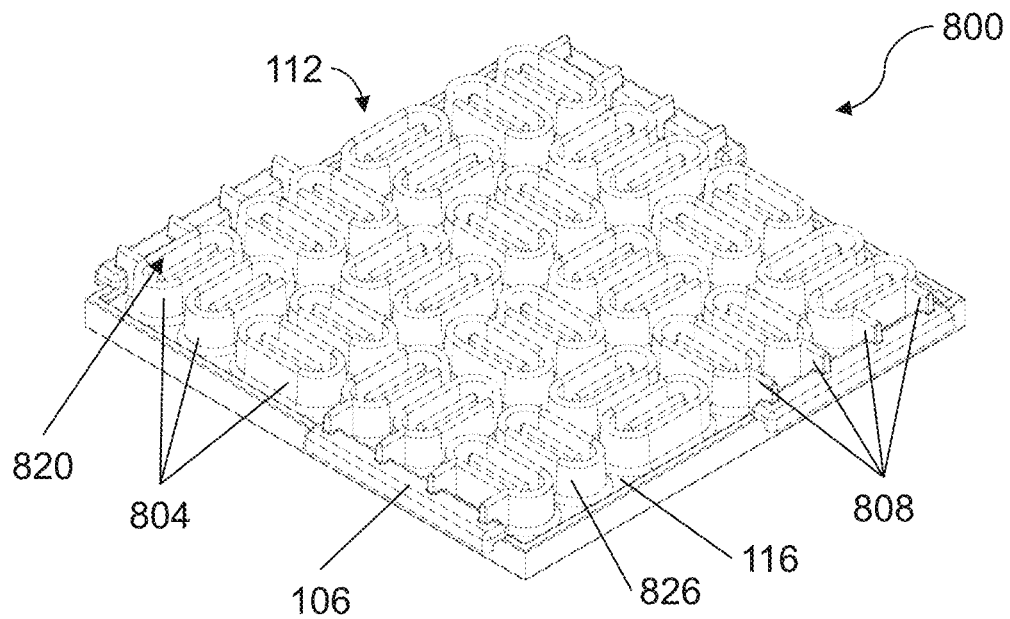
FIG. 42 is an isometric view of another shock absorbing mat/tile taken from the side and from below.

Turning to FIG. 42, another embodiment of a shock absorbing mat is shown and is generally identified by reference character 800. Shock absorbing mat 800 is similar to shock absorbing mat 100 previously described, with a few exceptions. In this embodiment, the shock absorbing members 804, which depend from the central portion 116 of the bottom surface 112, are arranged in longitudinally parallel groups of two (2) that are perpendicular to adjacent groups. Each shock absorbing member 804 is substantially pill-shaped or oblong and has a relief groove 820 formed therein. The relief groove 820 extends on a path following an outer surface 826 of the shock absorbing member 804 and spaced inwardly from the outer surface 826. The relief groove 820 divides the shock absorbing member 804 into an outer pill-shaped or oblong portion and an inner rib-shaped portion. Support ribs 808 extend downwardly from the interlocking elements 106 and the central portion 116 of the bottom surface 112, while extending laterally from the interlocking elements 106 to the outer surface 826 of adjacent shock absorbing members 804.

Figure 43:
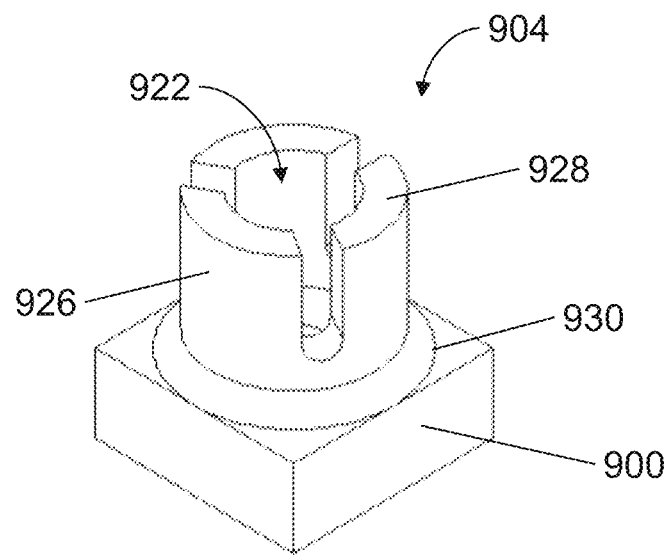
FIG. 43 is an isometric view of an alternative shock absorbing member taken from the side and from below for a shock absorbing mat/tile.
Figure 44:
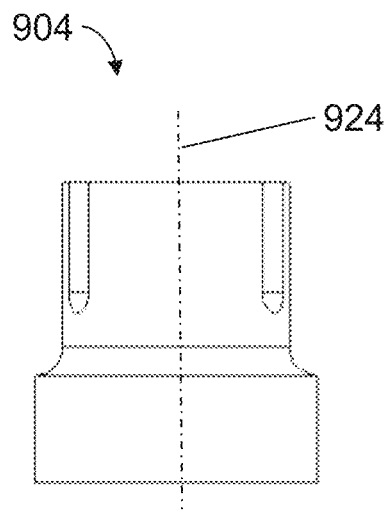
FIG. 44 is an elevational view of the shock absorbing member of FIG. 43.
Figure 45:
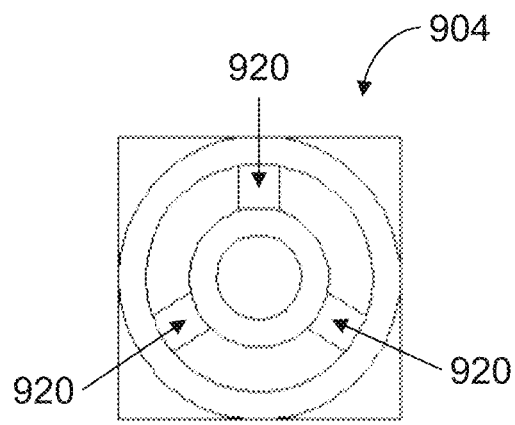
FIG. 45 is a bottom plan view of the shock absorbing member of FIG. 43.

Although various shock absorbing mats have been described above with reference to FIGS. 1 to 42, those of skill in the art will appreciate that further variations are possible. For example, the shocking absorbing mats may comprise shock absorbing members having alternative configurations. Turning to FIGS. 43 to 45, an alternative shock absorbing member configuration for a shock absorbing mat is shown and is generally identified by reference character 904. In this embodiment, the shock absorbing member 904 is substantially cylindrical in shape and has relief formations formed or provided therein. In this embodiment, the relief formations are in the form of three (3) relief grooves 920 and a substantially cylindrical central recess 922. The relief grooves 920 are equally spaced about a central axis 924 of the shock absorbing member 904. The relief grooves 920 extend radially from the central recess 922 to an outer surface 926 of the shock absorbing member 904. In the axial direction, the relief grooves 920 extend only partially from a distal end 928 of the shock absorbing member 904 to a base 930 of the shock absorbing member 904.

When shock absorbing members 904 are employed in a shock absorbing mat and a force with a downward component is applied to the top surface of the shock absorbing mat as a result of an impact, the shock absorbing members 904 compress axially and expand laterally to provide shock absorption. The relief grooves and central recess of each shock absorbing member 904 provide space to accommodate this lateral expansion during axial compression and assist to reduce stresses within each shock absorbing member 904.

Figure 46:
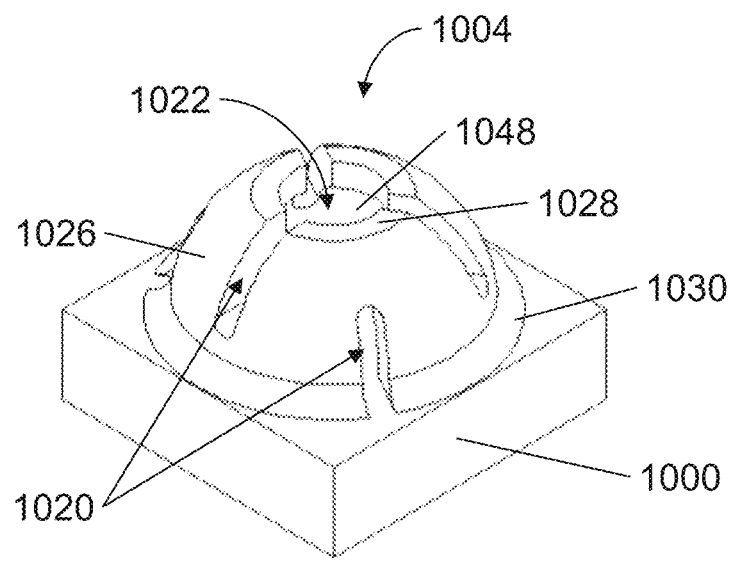
FIG. 46 is an isometric view of an alternative shock absorbing member taken from the side and from below for a shock absorbing mat/tile.
Figures 47, 48:
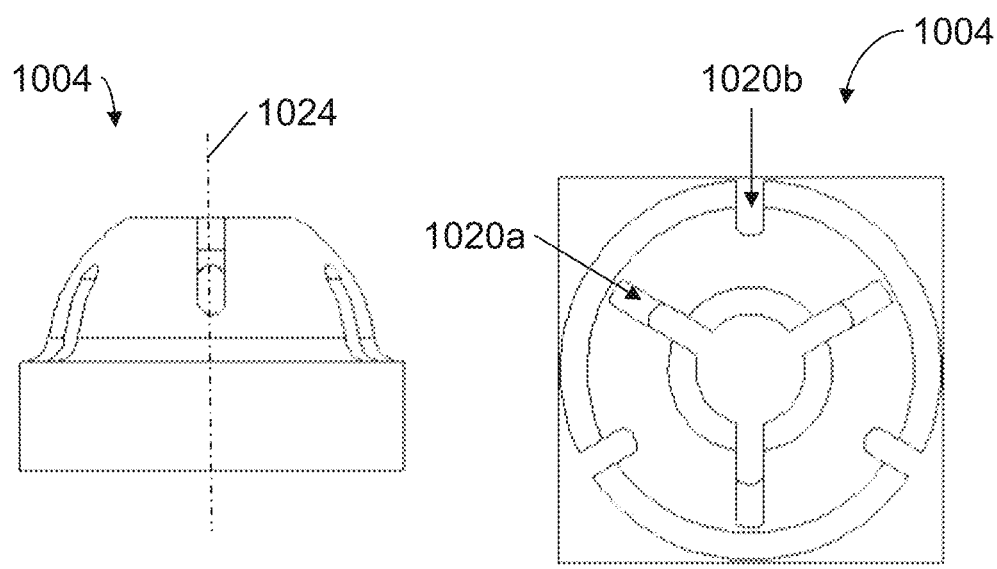
FIG. 47 is an elevational view of the shock absorbing member of FIG. 46.
FIG. 48 is a bottom view of the shock absorbing member of FIG. 46.

Turning to FIGS. 46 to 48, an alternative shock absorbing member configuration for a shock absorbing mat is shown and is generally identified by reference character 1004. In this embodiment, the shock absorbing member 1004 is hollow, generally semi-circular in shape and has relief formations formed or provided therein. In this embodiment, the relief formations are in the form of six (6) relief grooves 1020 and a cylindrical central recess 1022. The relief grooves 1020 are substantially equally spaced about a central axis 1024 of the shock absorbing member 1004 and extend radially with respect to the central axis 1024 between an inner surface 1048 of the shock absorbing member 1004 and an outer surface 1026 of the shock absorbing member 1004. Three (3) of the relief grooves 1020a extend axially from a distal end or tip 1028 of the shock absorbing member 1004 towards a base 1030 of the shock absorbing member 1004 and the other three (3) of the relief grooves 1020b extend axially from the base 1030 towards the tip 1028. Each of the relief grooves 1020 extends only partially axially through the shock absorbing member 1004.

When shock absorbing members 904 are employed in a shock absorbing mat and a force with a downward component is applied to the top surface of the shock absorbing mat as a result of an impact, the shock absorbing members 904 compress axially and expand laterally to provide shock absorption. The relief grooves and central recess of each shock absorbing member 904 provide space to accommodate this lateral expansion during axial compression and assist to reduce stresses within each shock absorbing member 904.

Although the shock absorbing mats disclosed herein have been shown and described as being generally square-shaped, it will be appreciated that in other embodiments the shock absorbing mats may be other geometric shapes (capable of tessellation when intended to be used with other shock absorbing mats to form floor coverings). In some embodiments, shock absorbing mats with a plurality of different shapes may be placed in repeating sequence to contiguously span a desired area and form a floor covering.

Although the shock absorbing mats disclosed herein have been shown and described as including interlocking elements to engage adjacent or neighbouring shock absorbing mats, it will be appreciated that in other embodiments the shock absorbing mats may not include such interlocking elements, especially if they are intended to be used in isolation.

Although the shock absorbing mats disclosed herein have been shown and described as including a plurality of similar shock absorbing members that are arranged in a uniform array, it will be appreciated that in other embodiments, the shock absorbing mats may comprise shock absorbing members arranged in different patterns and/or may have shock absorbing members of different shapes or configurations.

Although exemplary relief formations have been shown and described, it will be appreciated that alternative relief formation configurations that provide for lateral expansion of the shock absorbing members during axial compression thereof may be employed.

Although the shocking absorbing mats disclosed herein have been shown and described as being of a unitary construction, it will be appreciated that in other embodiments the shock absorbing mats may be of a multi-layered construction with the various layers being altered or otherwise bonded together via suitable means.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, and/or designed for the purpose of performing the function. It is also within the scope of the subject application that elements, components, and/or other subject matter that is described as being adapted to perform a particular function may additionally or alternatively be described as being configured to perform that function, and vice versa. Similarly, subject matter that is described as being configured to perform a particular function may additionally or alternatively be described as being operative to perform that function.

Although embodiments have been described above and are shown in the accompanying drawings, it will be appreciated by those skilled in the art that variations and modifications may be made without departing from the scope defined by the appended claims, and the scope of the claims should be given the broadest interpretation consistent with the specification as a whole.

What is claimed is:

1. A shock absorbing mat/tile comprising:
   a body having a generally planar, major top surface and an opposite bottom surface;
   a plurality of shock absorbing members depending from a central portion of the bottom surface, at least one of the shock absorbing members having at least one relief formation formed therein configured to accommodate lateral expansion of the shock absorbing member during axial compression thereof;
   a peripheral lip extending downwardly from the bottom surface and surrounding the central portion; and
   a plurality of supports depending from the bottom surface and located adjacent the peripheral lip, at least one of the supports being conjoined with the peripheral lip,
   wherein the shock absorbing mat/tile is of unitary construction and is formed of rubber material.

2. The shock absorbing mat/tile of claim 1, wherein a plurality of the shock absorbing members has at least one relief formation formed therein configured to accommodate lateral expansion of the shock absorbing member during axial compression thereof.

3. The shock absorbing mat/tile of claim 1, wherein a plurality of the shock absorbing members has a plurality of relief formations formed therein configured to accommodate lateral expansion of the shock absorbing member during axial compression thereof.

4. The shock absorbing mat/tile of claim 3, wherein each of the shock absorbing members is substantially identical.

5. The shock absorbing mat/tile of claim 3, wherein the relief formations comprise relief grooves that extend radially with respect to a central axis of the shock absorbing member.

6. The shock absorbing mat/tile of claim 5, wherein the relief grooves are circumferentially spaced about the central axis of the shock absorbing member.

7. The shock absorbing mat/tile of claim 6, wherein the relief formations further comprise a centrally located recess formed in the shock absorbing member.

8. The shock absorbing mat/tile of claim 7, wherein each shock absorbing member comprises two sets of the radially extending relief grooves, one set of the relief grooves extending radially outward from the centrally located recess and completely through the shock absorbing member and the other set of the relief grooves extending radially inward toward the centrally located recess and partially through the shock absorbing member.

9. The shock absorbing mat/tile of claim 8, wherein the relief grooves of the one set extend from a distal end of the shock absorbing member towards a base of the shock absorbing member and wherein the relief grooves of the other set extend from the base of the shock absorbing member partially towards the distal end.

10. The shock absorbing mat/tile of claim 8, wherein the relief grooves of the two sets have the same shape.

11. The shock absorbing mat/tile of claim 8, wherein the relief grooves of the two sets have different shapes.

12. The shock absorbing mat/tile of claim 3, wherein the relief formations formed in each shock absorbing member of the plurality are concentrically spaced about a central axis of the shock absorbing member.

13. The shock absorbing mat/tile of claim 12, wherein the relief formations comprise a centrally located recess formed in the shock absorbing member and at least one ring-shaped groove formed in the shock absorbing member defining annular shock absorbing portions.

14. The shock absorbing mat/tile of claim 13, wherein the annular shock absorbing portions are of different heights.

15. The shock absorbing mat/tile of claim 2, wherein the plurality of supports are positioned at locations that are less supported by the plurality of shock absorbing members and are positioned non-uniformly across the bottom surface.

16. The shock absorbing mat/tile of claim 2, further comprising a plurality of interlocking features about the periphery of the body configured to engage adjacent shock absorbing mats/tiles.

17. A floor covering comprising a plurality of shock absorbing mats/tiles in accordance with claim 16 arranged contiguously and with the interlocking features of adjacent shock absorbing mats/tiles engaged.

18. A shock absorbing mat/tile comprising:
   a body having a generally planar, major top surface and an opposite bottom surface;
   a plurality of shock absorbing members depending from a central portion of the bottom surface and arranged in an array, each of the shock absorbing members in the array being substantially identical and comprising at least one relief formation formed therein configured to accommodate lateral expansion of the shock absorbing member during axial compression thereof; and
   a plurality of supports depending from the bottom surface, the supports being positioned non-uniformly across the bottom surface at locations less supported by the plurality of shock absorbing members,
   wherein the shock absorbing mat/tile is of unitary construction and is formed of rubber material.

19. The shock absorbing mat/tile of claim 18, wherein adjacent rows/columns of shock absorbing members in the array are staggered.

20. The shock absorbing mat/tile of claim 19, wherein each of the shock absorbing members has a plurality of relief formations formed therein configured to accommodate lateral expansion of the shock absorbing member during axial compression thereof.

21. The shock absorbing mat/tile of claim 20, wherein the relief formations formed in each shock absorbing member of the plurality are concentrically spaced about a central axis of the shock absorbing member.

22. The shock absorbing mat/tile of claim 21, wherein the relief formations formed in each shock absorbing member of the plurality comprise a centrally located recess formed in the shock absorbing member and at least one ring-shaped groove formed in the shock absorbing member defining annular shock absorbing portions.

23. The shock absorbing mat/tile of claim 18, further comprising a plurality of interlocking features about the periphery of the body configured to engage adjacent shock absorbing mats/tiles.

* * * * *